United States Patent [19]

Butler

[11] Patent Number: 6,068,417
[45] Date of Patent: May 30, 2000

[54] ELECTRICAL KEY CONNECTION FOR EXPANDABLE KEYBOARD

[76] Inventor: Robert B. Butler, 20 Hazel Hill Rd., Mahopac, N.Y. 10541

[21] Appl. No.: 09/368,594

[22] Filed: Aug. 4, 1999

Related U.S. Application Data

[63] Continuation-in-part of application No. 09/040,550, Mar. 18, 1998, Pat. No. 5,938,353.

[51] Int. Cl.[7] .................................................. B41J 5/16
[52] U.S. Cl. ........................ 400/492; 361/680; 400/490
[58] Field of Search ................................. 400/492, 490, 400/472; 361/680; 345/169, 168; 235/145 R, 146; 341/22

[56] References Cited

U.S. PATENT DOCUMENTS

| | | |
|---|---|---|
| 3,940,758 | 2/1976 | Mavgolin . |
| 3,964,594 | 6/1976 | Gabbrielli . |
| 4,363,942 | 12/1982 | Deeg ........................................ 400/495 |
| 4,597,681 | 7/1986 | Hodges . |
| 4,739,541 | 4/1988 | Pitts . |
| 5,141,343 | 8/1992 | Roylance . |
| 5,163,765 | 11/1992 | Levy . |
| 5,187,644 | 2/1993 | Cuissan . |
| 5,212,473 | 5/1993 | Louis . |
| 5,220,521 | 6/1993 | Kikinis . |
| 5,267,127 | 11/1993 | Miles, Jr. . |
| 5,372,442 | 12/1994 | Wang ........................................ 400/495 |
| 5,388,921 | 2/1995 | Chung . |
| 5,439,304 | 8/1995 | Phillips . |
| 5,457,453 | 10/1995 | Chiu . |
| 5,494,363 | 2/1996 | Hochgesang . |
| 5,502,460 | 3/1996 | Bowen . |
| 5,519,569 | 5/1996 | Sellers . |
| 5,531,529 | 7/1996 | Nusser ...................................... 400/682 |
| 5,532,904 | 7/1996 | Sellers . |
| 5,539,615 | 7/1996 | Sellers ...................................... 400/682 |
| 5,543,787 | 8/1996 | Kavidys . |
| 5,575,576 | 11/1996 | Roysden, Jr. ............................... 400/88 |
| 5,587,875 | 12/1996 | Sellers ...................................... 400/682 |
| 5,590,020 | 12/1996 | Sellers ...................................... 400/682 |
| 5,595,449 | 1/1997 | Vitkin . |
| 5,602,715 | 2/1997 | Lempicki .................................. 400/682 |
| 5,615,081 | 3/1997 | Ma ............................................ 400/682 |
| 5,619,394 | 4/1997 | Oros .......................................... 400/682 |
| 5,625,532 | 4/1997 | Sellers ...................................... 400/682 |
| 5,635,928 | 6/1997 | Takagi . |
| 5,646,817 | 7/1997 | Manser ..................................... 400/682 |
| 5,648,771 | 7/1997 | Halgren . |
| 5,654,872 | 8/1997 | Sellers ...................................... 400/682 |
| 5,659,307 | 8/1997 | Kavidys . |
| 5,666,112 | 9/1997 | Crowley . |
| 5,667,826 | 9/1997 | Lasater ..................................... 400/490 |
| 5,687,058 | 11/1997 | Roylance . |
| 5,717,431 | 2/1998 | Chia-Ying . |
| 5,742,241 | 4/1998 | Crowley . |
| 5,870,034 | 2/1999 | Wood . |
| 5,880,712 | 3/1999 | Goldman . |

*Primary Examiner*—John S. Hilten
*Assistant Examiner*—Daniel J. Colilla

[57] ABSTRACT

An alphanumeric keyboard whose keys are mounted on a scissor-linkage and have interlocking sides that allow said keyboard to contract to a width that is considerably less than the width of a standard desktop computer keyboard and which is operable when open or closed.

82 Claims, 16 Drawing Sheets

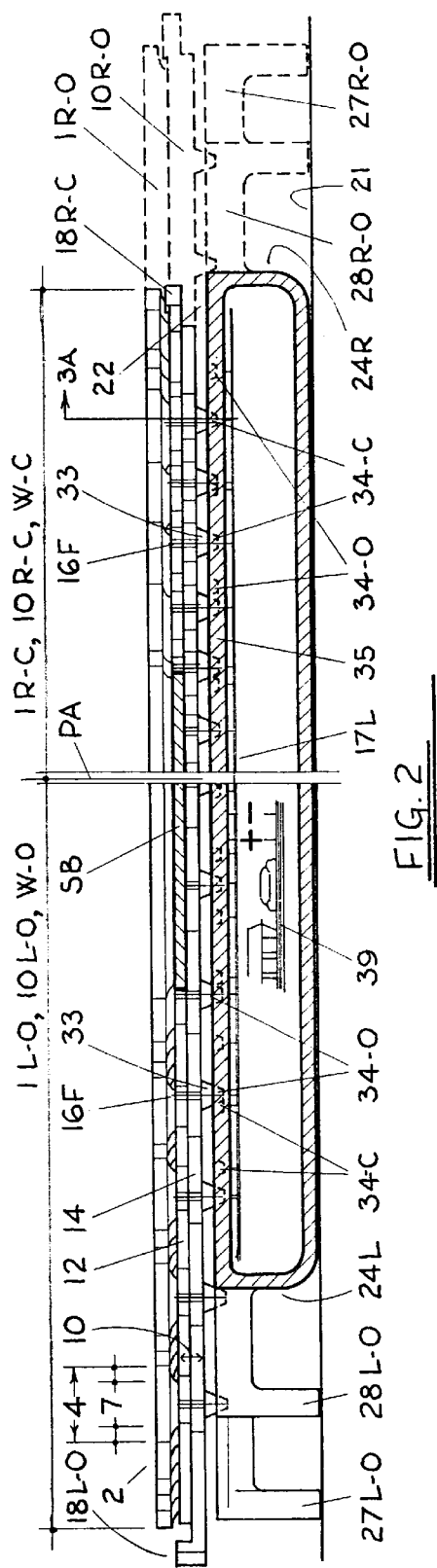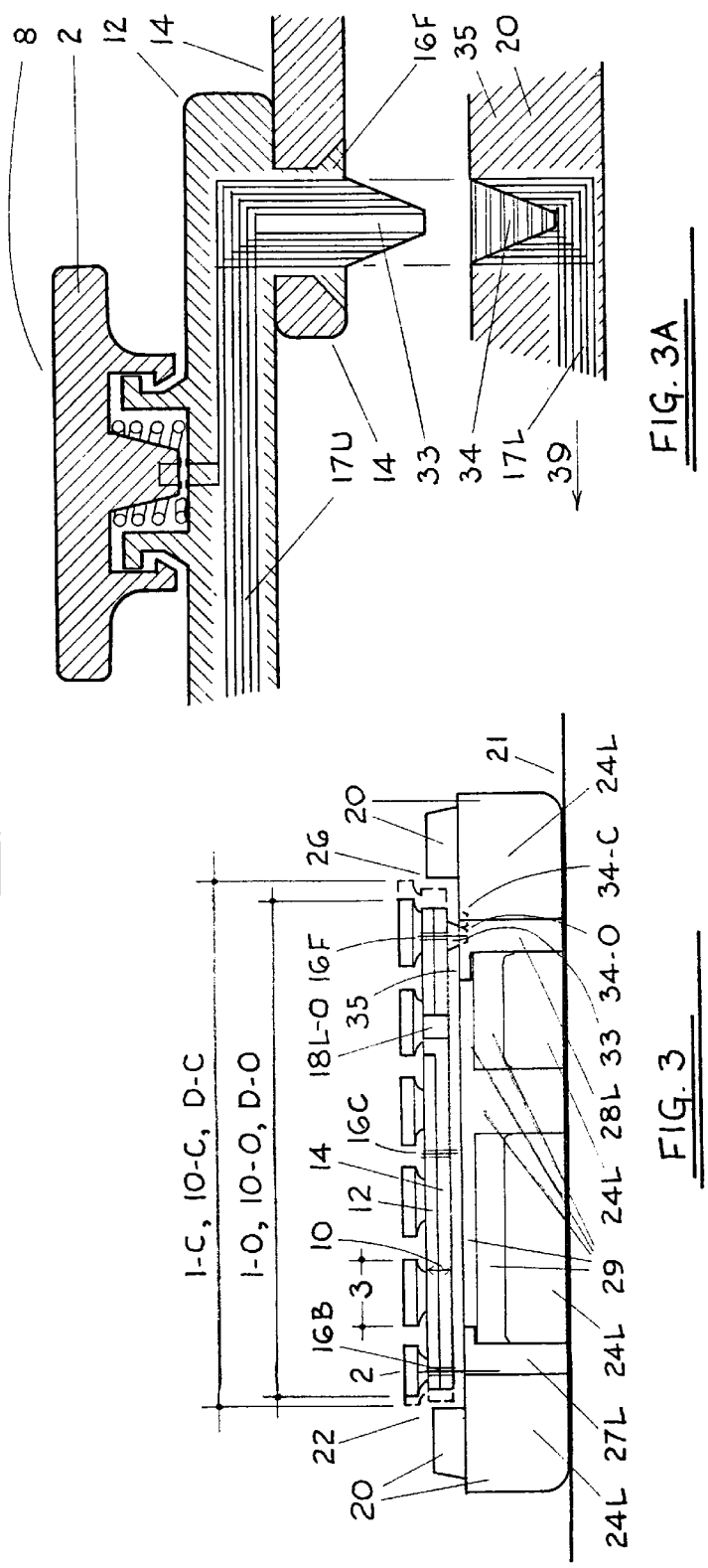

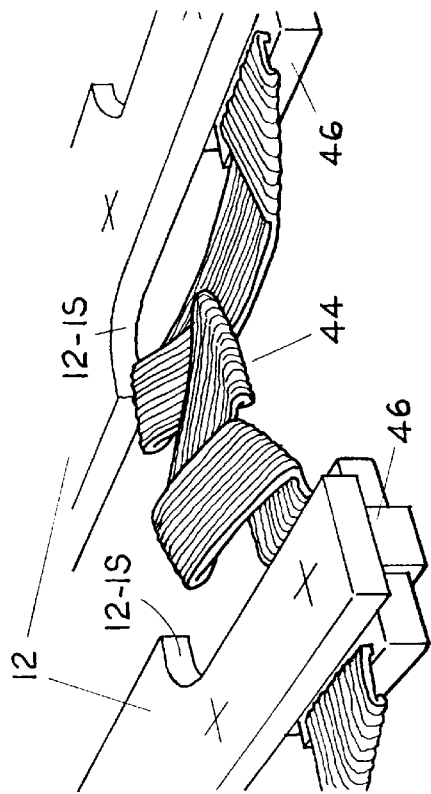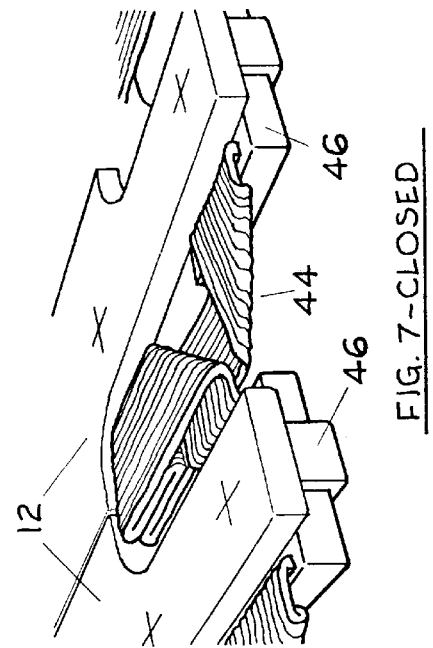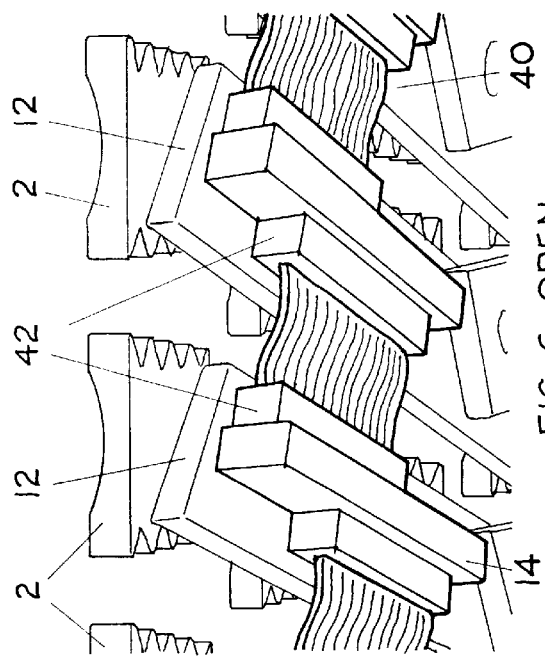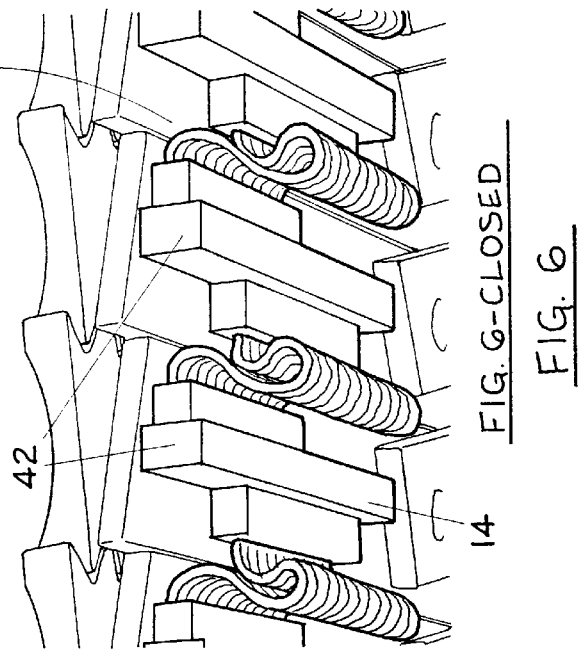

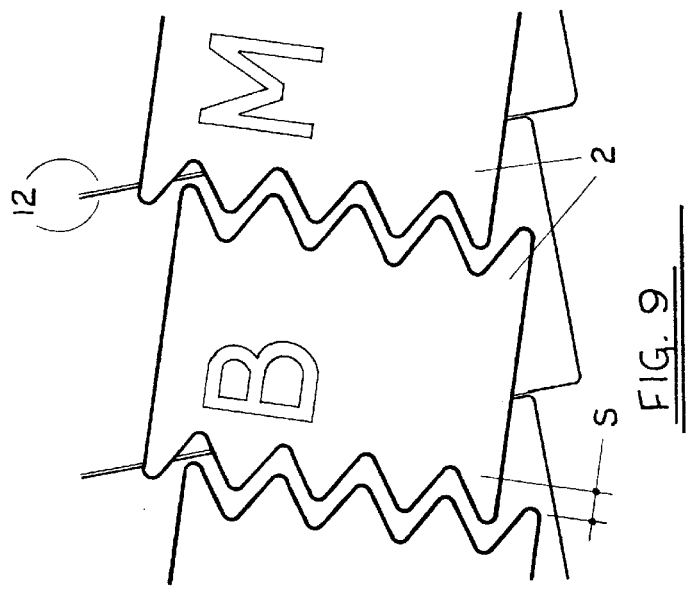
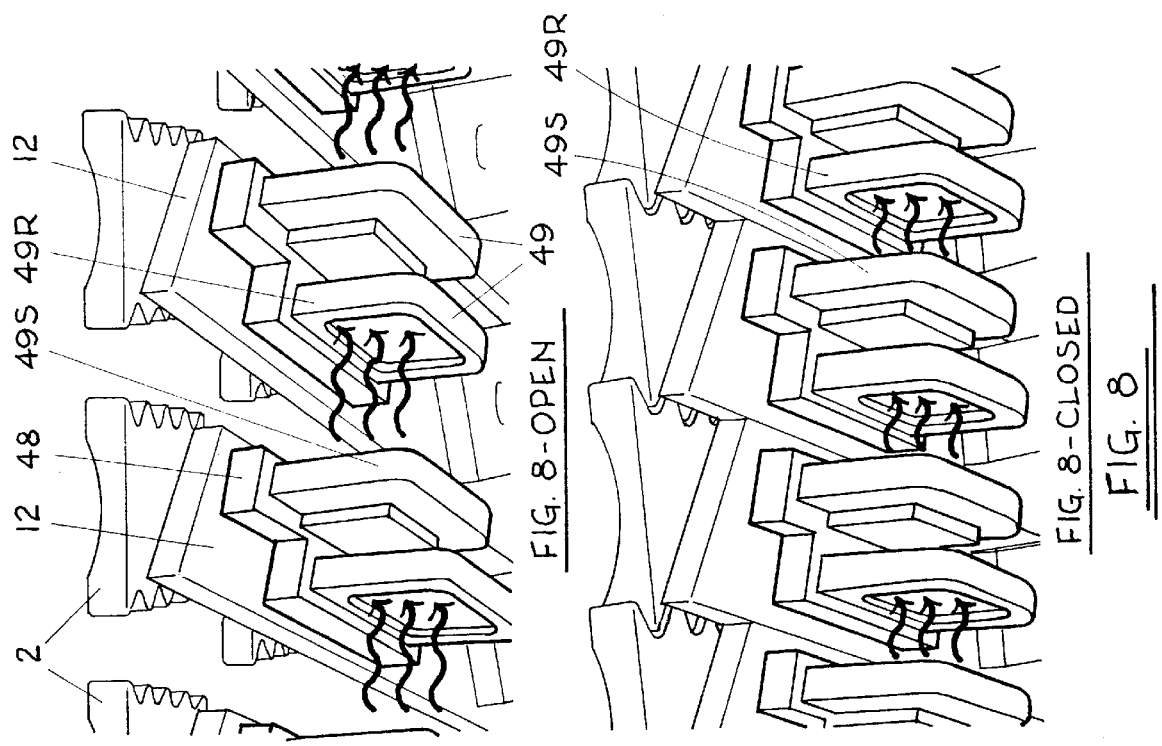

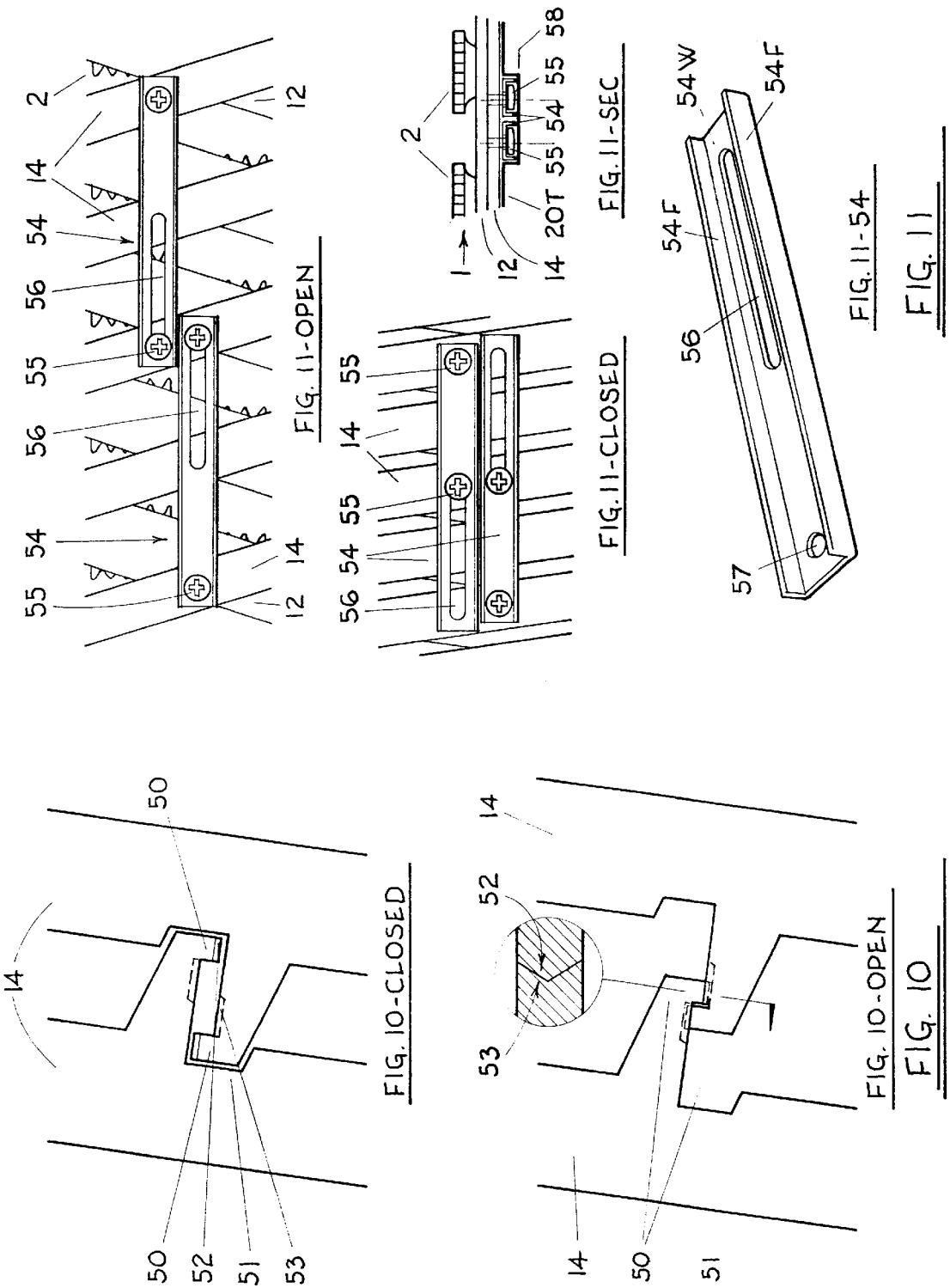

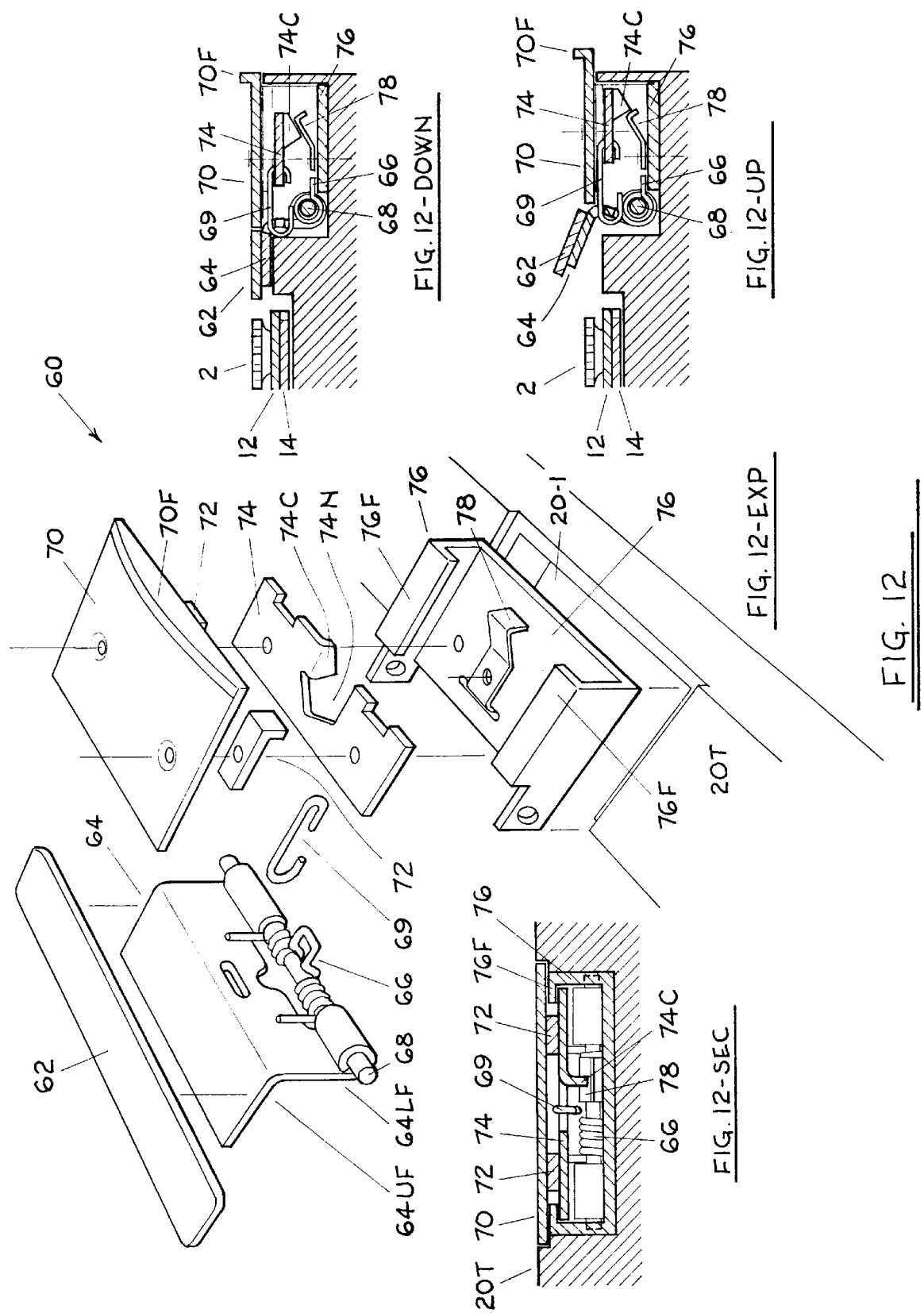

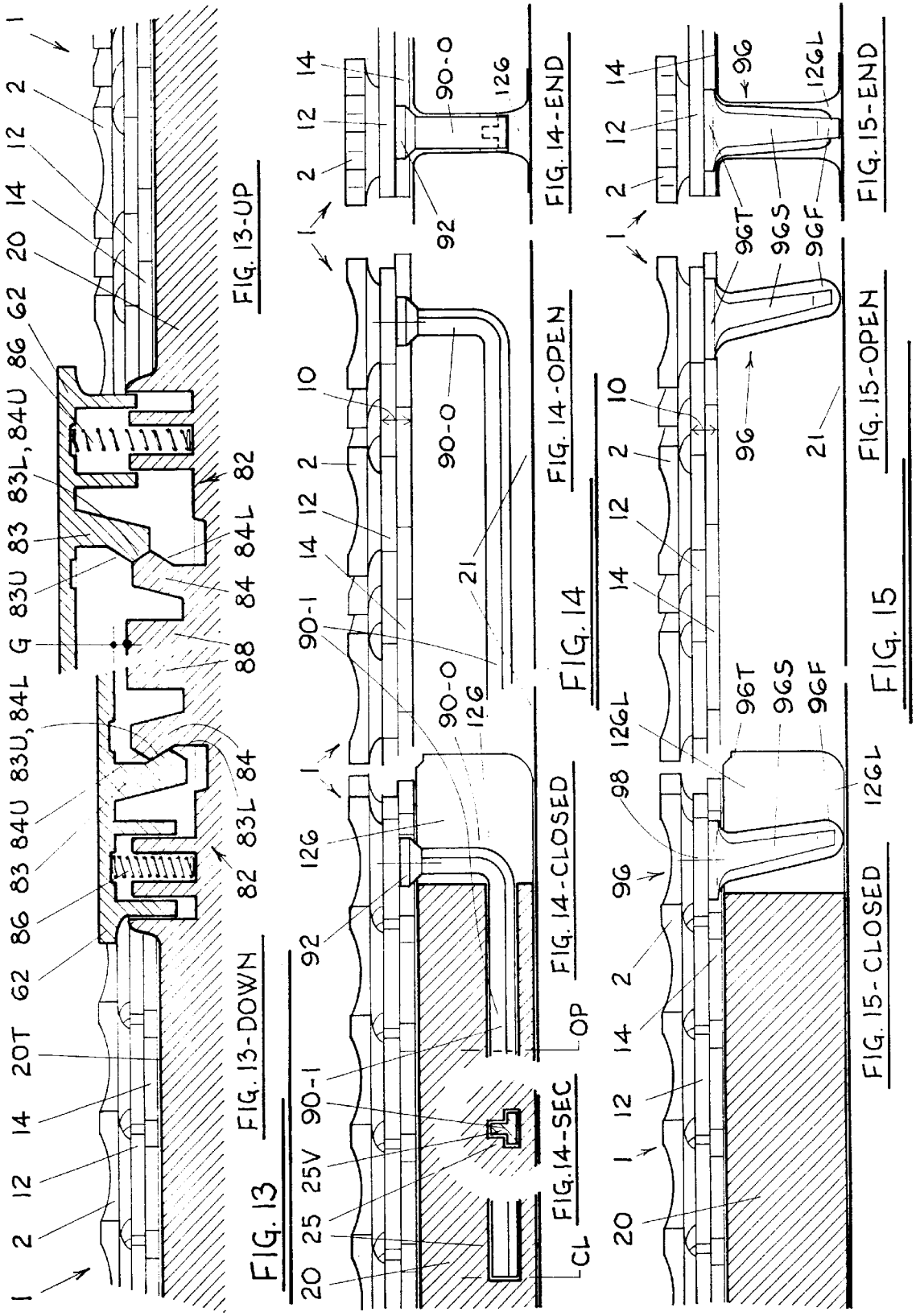

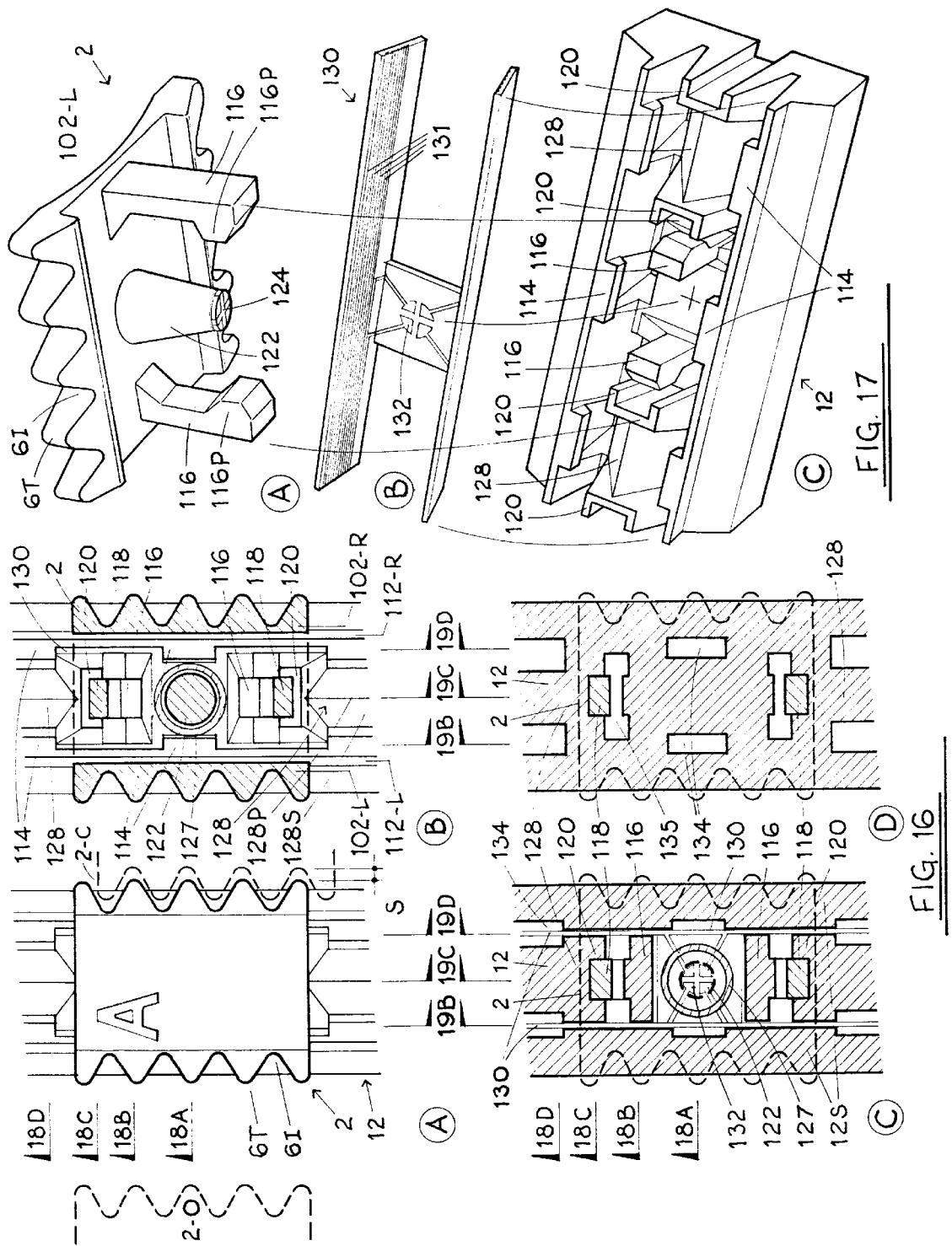

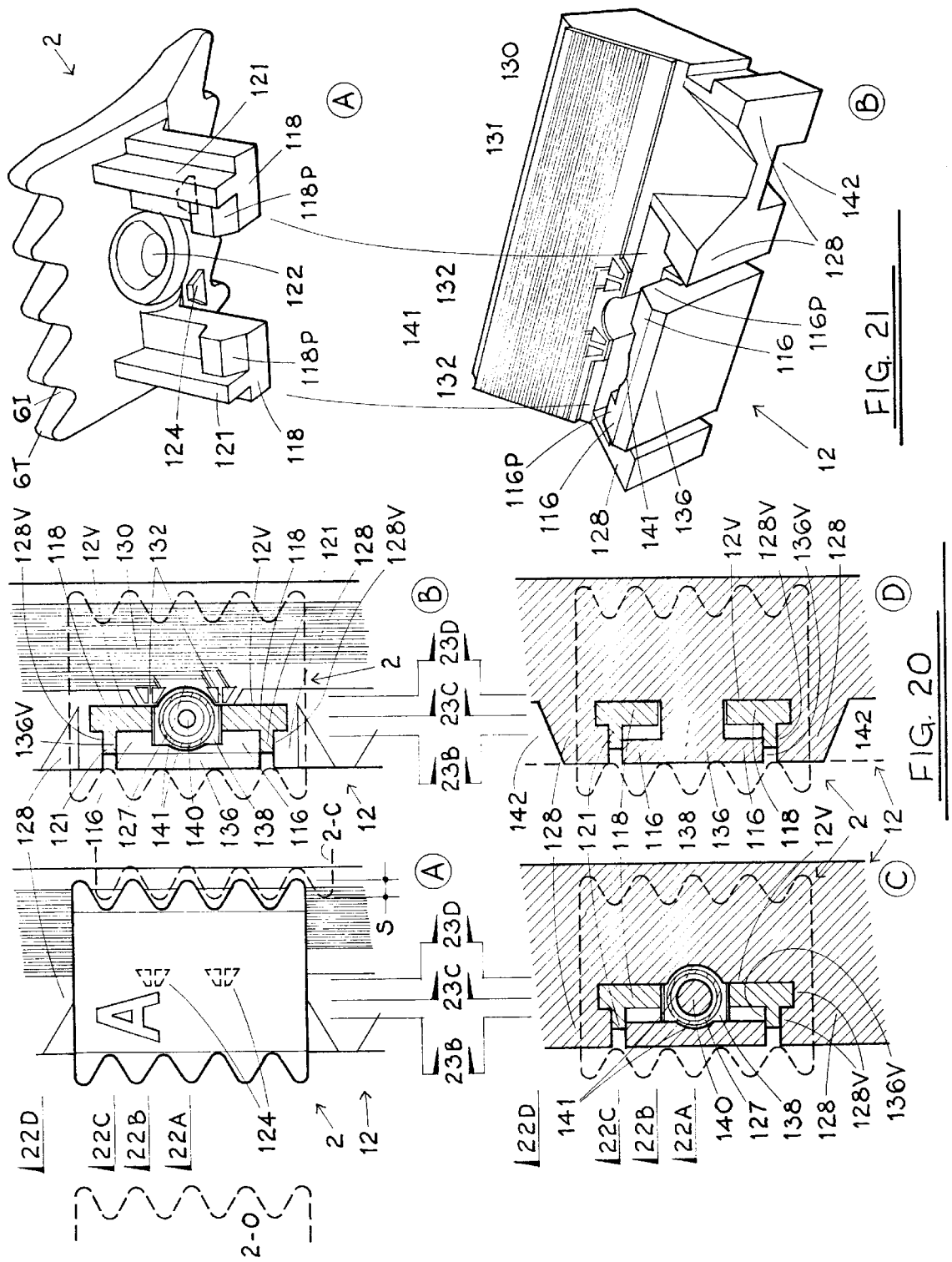

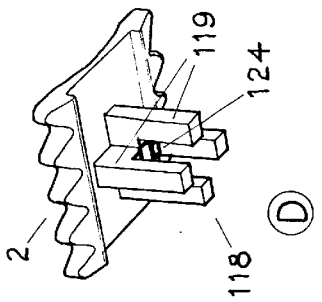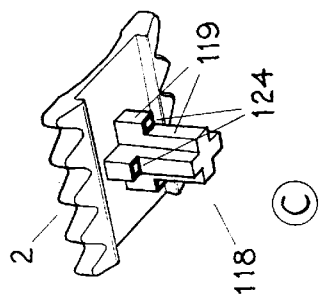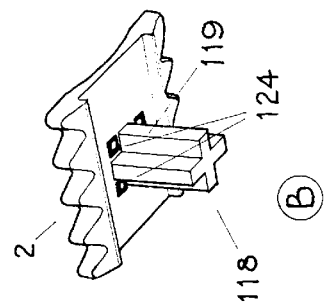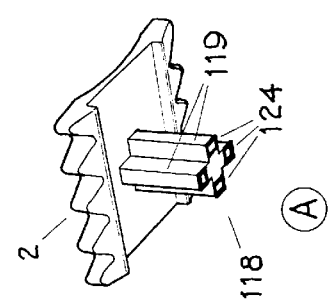
FIG. 24
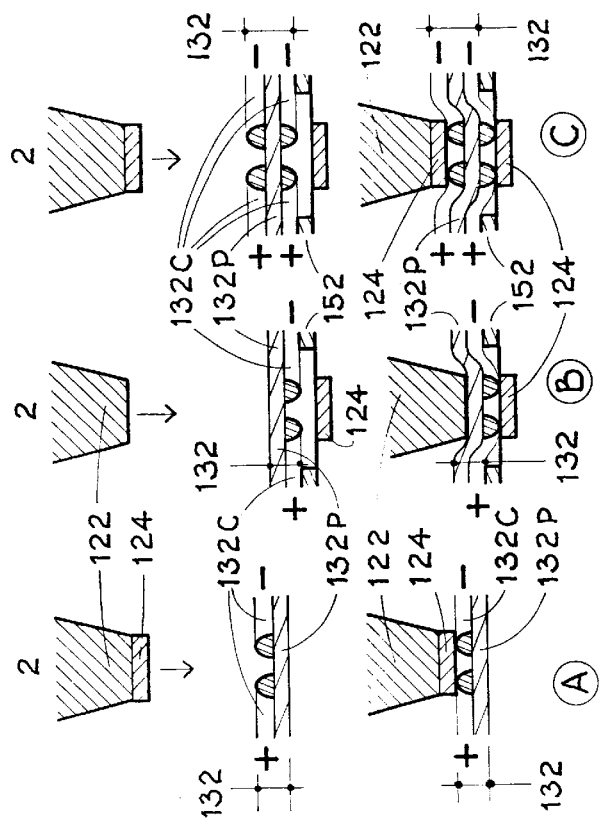
FIG. 26
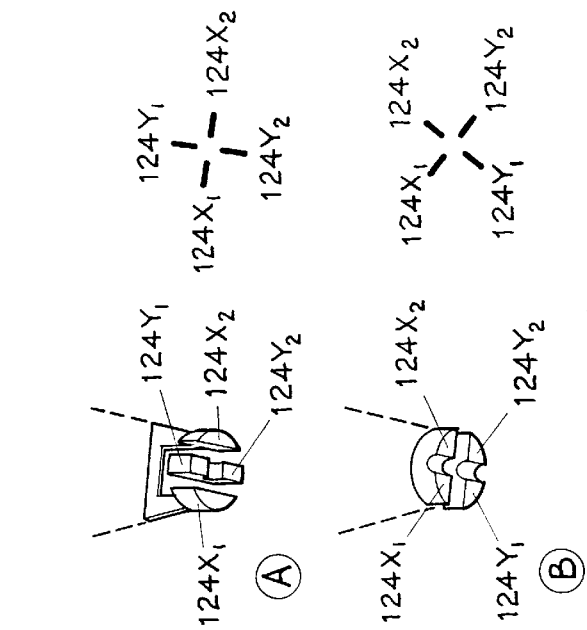
FIG. 25

ELECTRICAL KEY CONNECTION FOR EXPANDABLE KEYBOARD

This is a Second Continuation In Part (C.I.P. No. 2) of a Patent whose original filing date was Mar. 18, 1998, whose Ser. No. is 09/040,550, now U.S. Pat. No. 5,938,353 and whose First Continuation In Part (C.I.P. No. 1) was submitted to the PTO on Jun. 1, 1999.

FIELD OF THE INVENTION

This invention relates in general to the use of small computers and other lightweight or mobile electronic devices that receive data input by alphanumeric or operational means.

BACKGROUND OF THE INVENTION AND PRIOR ART

This is a Second Continuation In Part (C.I.P. No. 2) of a present Patent Pending whose filing date was Mar. 18, 1998, whose Ser. No. is 09/040,550, now U.S. Pat. No. 5,938,353, and whose First Continuation In Part (C.I.P. No. 1) was submitted to the PTO on Jun. 2, 1999.

Throughout the 1990s the computers that millions of people now use worldwide have improved at an amazingly rapid rate, to the point that the power and mobility these devices now have is truly breathtaking. In particular, the amount of work they can do has greatly increased while at the same time their size has greatly decreased, the latter to the point that today a capacious and multifunctional computer can be made that is no bigger than a common videocassette. But such devices have one major limitation: their keyboard keys are presently so small and close together that it is impossible to enter data into them at typical secretarial speed for any length of time. Indeed, in February 1998 one research manager for a major computer maker (Celeste Baranaski of Hewlett-Packard) said: "Unless some breakthrough is made in keyboard technology, many of these smaller travel keyboards just won't work." And in that same month a journalist (David MacNeill of *Pen Computing Magazine*) said of present palmtop computers that their "Inappropriate input methods, such as tiny QWERTY keyboards, hobble us in our attempt to enter our information into a device, wasting our time, and even causing physical pain." Indeed, even a slight reduction in a keyboard's width may significantly reduce a typist's speed—as then the keys are arranged differently than the spacing at which one may be accustomed to typing.

However, a few inventors have long been aware of this potential deficit of typewriters, computers, laptops, palmtops, calculators, and other alphanumeric/operational input devices that are designed with versatility and mobility in mind. For example, in 1974 George Margolin in his U.S. Pat. No. 3,940,758 described an EXPANDABLE KEYBOARD FOR ELECTRONIC POCKET CALCULATORS AND THE LIKE, in which "a keyboard of familiar layout for a full-size desk top data terminal is organized in three modular portions," which when closed its three modular portions are arranged in a stacked position as shown in FIG. 7 of Margolin's Patent. But it is obvious that Margolin's invention, while reducing the surface or 'footprint' area occupied by a standard desktop keyboard by about two-thirds, does so at a sacrifice of triply increasing the keyboard's depth, so that such a device could hardly be carried like a videocassette in one's pocket or purse. Then in 1991 Adrian Crissan in his U.S. Pat. No. 5,187,644 described a COMPACT PORTABLE COMPUTER HAVING AN EXPANDABLE FULL SIZE KEYBOARD WITH EXTENDIBLE SUPPORTS, in which the outer quarters of his keyboard comprise "a pair of fold-out flaps containing a portion of the keys" which can be rotated upward and inward so that when closed said outer quarters lay flat upon the middle half of the keyboard. But this arrangement also considerably increases the invention's depth by the thickness of its folded-over portions, as is obvious from examination of FIG. 1 of Crissan's Patent. A further deficit of Margolin's and Crissan's inventions is that when their keyboards's outer portions are folded onto their central portions, all the keys are concealed so they cannot be used when their keyboards are thusly closed. A number of other patented keyboards, especially U.S. Pat. No. 5,141,343 to Roylance for a COMPRESSIBLE/EXPANDABLE KEYBOARD WITH ADJUSTABLE KEY SPACING, U.S. Pat. No. 5,659,307 to Karidis et al for a KEYBOARD WITH BIASED MOVABLE KEYBOARD SECTIONS, U.S. Pat. No. 5,543,787 to Karidis et al for a KEYBOARD WITH TRANSLATING SECTIONS, and U.S. Pat. No. 5,870,034 to Wood for a COMPACT COMPUTING DEVICE WITH COMPRESSIBLE KEYBOARD (see also Classes 400/88 and 400/682) have keys arranged that close upward, downward, or sideward in various ways, but none of them simultaneously allow the parent system to (a) reduce its width by as much as 40 percent without compromising any other dimensional aspect and (b) operate in both open and closed positions as does the Disclosed Invention.

SUMMARY OF THE INVENTION

If one looks at a standard keyboard, one will notice a significant amount of space between the sides of any pair of adjacent keys. In a standard keyboard with 'Chiclet' style keys and a standard 19 mm pitch (center-to-center dimension between two adjacent keys), these intervening voids typically include about one-third the center-to-center distance between adjacent keys. Now if these voids could somehow be maintained when the keys were in standard or 'open' position, yet eliminated when the keys were in contracted or 'closed' position, a keyboard's total width could easily be reduced by about one-third when closed. Then if the sides of each key were given indented profiles that would allow each pair of adjacent keys to interlock when they closed, the distance between their centers could be reduced even more, until a 28–29 cm wide standard keyboard could easily be fitted into the 18–19 cm length of a common videocassette—at no increase of depth. This is what the Disclosed Invention does. Specifically, its keys are mounted on a laterally flexible assembly made of a multiple-X network of supporting busbars and interconnecting braces, in which the busbars conduct electronic data from any activated key mounted on their tops and the braces interconnect the busbars and stabilize them and the keys above; then the sides of adjacent keys have indented profiles that enable all the keys to be drawn even closer together than could occur with normally-sided keys. The busbars may also have positional guides beneath their front ends that keep the keyboard from sliding or moving out of place whether it is open or closed, and these guides may have electrical contacts that conduct electronic data from the keys' microcircuitry to the operational circuitry of the parent computer or other electronic system, also whether the keyboard is open or closed. The Disclosed Invention's total assembly of keyboard and laterally flexible assembly would also remain thin, so its depth alone will not seriously impact the depth of the parent system in which it is installed.

The utility of the Disclosed Invention is further enhanced by certain means of trigonometric trickery that seem to deceive the eye. For example, when the laterally flexible assembly's sides extend from closed to open position, its front-to-back or longitudinal dimension must necessarily decrease; but surprisingly, when its lateral dimension is increased from 17.7 to 27.8 cm—more than 57 percent—its front-to-back dimension decreases by only 9.36 to 9.13 cm—hardly 2 percent. Indeed, at the above dimensions (which were taken from a working model made by the inventor), the disclosed keyboard's surface area when in open position is actually 53 percent greater than when closed. Thus this keyboard, while greatly increasing the width of its keys when it is extended to open position, does not create rows of keys whose fronts and backs become too close together when they are open nor does it seriously affect the longitudinal dimension of its parent system when they are closed. Another trigonometric trick of the Disclosed Invention's laterally flexible assembly is that when it contracts, the keys mounted on it rotate slightly, which allows the keys' indented side edges to interlock in a manner that enables the keys to have the same side-to-side symmetry as those of normal keyboard keys—qualities that make the disclosed keyboard more interesting and attractive as well as easier to use.

Subsequent to this Patent's original filing date, the Inventor has made numerous improvements to the Disclosed Invention and incorporated them into this Continuation-In-Part (C.I.P. No. 1), as described below:

As originally filed, the Disclosed Invention includes a certain matrix of electrical conductors that underlies the keys and conducts electronic data through electrical contacts on their undersides of their busbars to the parent computer or other electronic system that the invention serves. However, this matrix of conductors has been improved as follows:

If one examines the matrix of microcircuitry that underlies the keys of a standard computer keyboard, one will find in addition to numerous horizontal and vertical circuits all sorts of diagonal and curving circuits, of which the latter are not adaptable to the arrangement of "essentially parallel and equidistant microbusbars as described in " the Disclosed Invention as originally filed. On the other hand, the wiring matrix that underlies a typical digital-dial telephone's four-by-three-row arrangement of 12 keys (10 numerals plus the # and * keys) is a simple arrangement of four horizontal and three vertical circuits. Now, considering that the keys of the Disclosed Invention are arranged in horizontally lateral rows (i.e. the A S D F G H J K L ; ' keys) and diagonally front-to-back columns (i.e. the busbars oriented as \\\\\", of which the F3-3-E-D-C keys comprise one such column".), a digital phone wiring matrix can be enlarged, laid nearly flat, and its top inclined slighty to the left so its horizontal and vertical wires align with the keyboard's rows and columns of keys. Then, since a number of these hair-sized conductors can easily be arranged as on computer circuitboards within the width of a busbar (especially if these bars are widened as described further below), the horizontal wires on each busbar may extend along the sides of the keys and converge at a collector locus near the back of the bar, from where a flexible multiple microconductor known as "ribbon wire" or "flat cable" can span the varying distance to a mating collector locus near the back of the adjacent busbar. Such flexible multiple microconductors are found in many of today's computers and their printers, two examples being the flexible flat cable that extends from a laptop computer's base through its hinged top to its LED display, and the ribbon cable that extends from an ink-jet printer's processor to its ink-cartridge assembly (these latter cables are so flexible and durable that much of their 14-inch length is bent almost 180° every second as the ink-cartridge assembly dashes back and forth across each page as the printer operates). Next, suppose the keyboard is divided into three parts: (1) the leffmost keys that lie to the left of the centermost bar, (2) the rightmost keys that lie to the right of the centermost bar, and (3) the centermost bar, or spine bar, which is the busbar that supports the keys F6-6-Y-H-N. Now, considering only the leftmost keys for the moment, these keys have 6 horizontal rows and 6 near-vertical rows. Thus, adapting the digital phone wiring matrix described above, these keys can have 6 horizontal wires and 6 near-vertical wires underlying their rows and columns; then on each busbar each horizontal wire turns upward at the sides of each key and the vertical wires turn to the right at the bar's back in a manner that leads all the wires to a collector locus near the back of the bar; then from here the wires (plus possibly an incoming power and/or ground wire) extend via a flexible flat cable to a second collector locus on the busbar adjacent to the right, and in this manner a series of flat cables extends from busbar to busbar toward a collector locus near the back of the spine bar. Such a matrix comprises the microcircuitry for the leftmost keys of the keyboard, and a similar matrix of microcircuitry for the rightmost keys is for the most part a mirror image of that of the leftmost keys. Then all the leftmost and rightmost wires (plus the wire for the spine bar's keys) extend from the back of the spine bar to its front, where, since this bar's bottom moves very little as the keyboard opens and closes, a final flexible flat cable connects all the leftmost, rightmost, and spinebar wires to an XY decoder situated beneath the spacebar. Then from the XY decoder a pulse train of binary code from all the keys enters the parent system where this data is processed into the characters that appear on the system's display.

However, before proceeding on, an important exception to the above-described XY matrixing should be pointed out here. The number of circuits required for each key can be other than two: it can be one, or three, or theoretically any other number, because all that is necessary is for each key to have its own unique combination of circuits leading from it to the parent system's processor. Obviously one extreme would be for each key to have its own private circuit to the parent processor; but this of course would be a cumbersome ribbon for a keyboard of more than seventy keys to carry. The other extreme would be for each key to be lined up on a neat XY matrix, as then a minimum number of circuits could serve all the keys. But for reasons that are too complicated and irrelevant to describe here, some operational or functional keys usually need their own individual 'hot line' to the parliamentary processor, a circuit they share with no other key; so that in most embodiments of the Disclosed Invention the collective feeder ribbon that connects the whole keyboard to the parent processor will likely contain more than the theoretically minimum number of circuits.

The chief advantage of this microcircuitry matrix as described above is not only its improved nature but its articulation. Although the Disclosed Invention's Patent as originally filed described a means of conducting electronic data from the keyboard to the parent system, it did little more than describe this circuitry in one of its drawings as "a typical schematic of the microcircuitry" in part of one busbar and the parent system below. And prospective manufacturers of the Invention have evinced a desire to know not only that electronic data can be conducted from the keyboard to the parent system, but how; and their interest in the Disclosed Invention will remain nascent until they have this information. Thus this Continuation in Part includes a microcircuitry map of the keyboard and claims related thereto.

An important aspect of the above-described microcircuitry is the design of the flexible flat cables that conduct electronic data from busbar to busbar to the XY decoder beneath the spacebar whether the keyboard is open or closed. These conductors may have at least three equally functional embodiments: (1) A flexible flat cable or ribbon that extends from the back of one busbar to the back of the adjacent bar so that when the keyboard is open the ribbon extends rather flatly between the bars and when the keyboard is closed the ribbon droops pronouncedly between the bars. (2) A flexible flat ribbon folded into a roughly "W" shape whose ends are connected to indents in the adjacent sides of two busbars so that the ribbon remains generally in its plane of movement as the keyboard opens and closes. There are many possible variations of this type of conductor. In fact, ribbon 1 may also have one or more accordion-like folds that reduce the depth of its ride. (3) Conductance via wireless means. By locating on each busbar a small microchip with a drive circuit that activates an adjacent sender photodiode and locating on the adjacent busbar a mating microchip and receiver photodiode, a series of wireless sender/receivers can carry electronic data from busbar to busbar on to the XY decoder under the spacebar. The chief advantage of all three conductors is that they give prospective manufacturers more flexibility in assembling the Disclosed Invention according to their own design criteria and inclinations.

As originally filed, the Disclosed Invention's keyboard establishes its minimum width when closed by having the sides of its keys touch each other as they interlock. But if the keys touch, any depressed key might activate an adjacent one. However, if the width of each busbar is increased until it is, say, 1 mm wider than the narrowest or indent-to-indent width of each key above, the busbars' abutting sides will maintain a 1 mm gap between the indents of adjacent keys when the keyboard is closed. The wider busbars can also hold a given number of microconductors more easily, they provide a wider anchor for the keys mounted thereon, and they can be made thinner while remaining just as strong which creates a thinner computer. Also, the laterally flexible assembly's braces can be made wider as described above instead of or in addition to the busbars.

As originally filed, the Disclosed Invention included guides on the underside of its laterally flexible assembly that positioned the keyboard and conducted electronic data between its keys and and the parent system when the keyboard was in open and closed position. Although subsequent improvements in the Disclosed Invention have indicated that the original positional guides/circuitry conductors may not be the optimal solution for these two different functions, recent analysis has indicated another function for such guides which this Disclosure has not yet addressed. This is a need for the keyboard to inform a user when it has reached its open and closed positions. This the keyboard could easily do by having a number of small guides on its underside that mate with a similar number of receptive surfaces on the parent system below to create an audio/tactile means that informs the user when the keyboard has reached its exact open or closed position, as then the user will not be left wondering whether or not the desired position has been attained.

As originally filed, the Disclosed Invention's keyboard has no means of limiting its maximum width when open, other than "the movable positional guides on the undersides of the busbars that serve to accurately locate the keys." But such guides do not solve a 'linkage-lag' problem revealed by the Invention's prototypes built subsequent to this Patent's original filing: when the closed keyboard is opened, the outer busbars tend to open even wider than their 19 mm spacings before the central bars begin to spread apart, even if the laterally flexible assembly is precisely made. But if integral hooks are placed on the sides of the laterally flexible assembly's braces as shown in FIG. 11 of the Drawings, the hooks will rotate slightly as the keyboard opens and interlock when the keys are 19 mm apart. Another way to achieve the same result is to locate a series of sliding slotted stops on the braces' undersides as shown in FIG. 12 of the Drawings. Such limiters not only eliminate the "linkage-lag" problem described above and establish the exact 19 mm key-to-key pitch that equates this keyboard's open position with standard desktop keyboards, they additively determine the width of the keyboard when it is open.

As originally filed, the Disclosed Invention has only two positions: open and closed. However, certain embodiments could have positional guides that articulate an intermediate setting between these two positions, for purposes of making the Invention more useful for children with small hands whose fingers might not easily reach a keyboard's normally-spaced keys. This feature could have significant ramifications in the field of elementary education.

As originally filed, the Disclosed Invention makes no mention of any up-and-down movement of the spacebar, other than implying that it moves up and down during its normal operation. However, in certain embodiments this elongate key may need to lift upward slightly to allow the keyboard to slide more freely as it opens and closes, and/or this key may need to push downward slightly and hold the keyboard secure while the latter is being used. Such lifting and clamping can be achieved by installing a spring mechanism with a small handle on top directly in front of the spacebar, so that when the handle is moved one way it forces the spacebar up and when it is moved the other way it forces the spacebar down. Another means of doing the same is for the spacebar to spring up slightly as the keyboard is opened or closed, then the bar is pushed back down before the keyboard is used.

As originally filed, the Disclosed Invention has four supports on the computer's sides which swing outward before the keyboard is opened so they can hold up the outermost keys that protrude beyond the computer's sides; then after the keyboard is closed, the supports swing back into the computer's sides. But a simpler way to provide the same support is to mount under the keyboard's outer corners four small legs that are mostly hidden in the computer's base when the keyboard is closed then slide out automatically as the keyboard is opened. But for such legs to work well, the parent system would have to rest on a planar surface. But this need can be eliminated by installing under the keyboard's corners outriggers that cantilever from the computers base as the keyboard is opened. Then when fully open, the keyboard's outermost keys are supported in a way that enables a small computer to be placed on one's lap or any other irregular surface.

Subsequent to this Patents First Continuation In Part (C.I.P. No. 1) which was submitted to the PTO on Jun. 1, 1999, the Inventor has made further improvements to the Disclosed Invention and incorporated them into this Second Continuation-In-Part (C.I.P. No. 2), as described below:

As originally filed in this Invention's Patent and subsequently filed in its C.I.P. No. 1, the Disclosed Invention includes a keyboard of alphanumeric and operational keys wherein each key is mounted on a busbar, of which a typical key-to-busbar construction is shown in the sectional view of FIG. 3A. However, this key-to-busbar construction has been improved as follows:

1. The tops of each key are dished from front to back, the outer edges of their interlocking sides are thinner and become gradually thicker toward the key's center, and the continuous edge beneath the key that engages a longitudinal guide projecting from the busbar below is replaced by two prongs projecting from the key's underside, wherein said prongs engage two similar prongs rising from the busbar in a manner which holds the key in place when it is poised in unactivated position and allows the key to be removed for purposes of cleaning and repair when an upward leverage is applied under one of its edges.
2. The tiny circular spring beneath each key is replaced by a flexible circular hollow grommet that collapses to a fraction of its height when pressure is applied to its top.
3. The circuitry that conducts electronic data from each activated key to the parent system and is imbedded in the busbar's connection to the brace below (see FIG. 3A) is replaced by a paper-thin ribbon of slightly flexible plastic with the key's circuitry printed on its surface and is located separately from the busbar's connection to the brace below. Many such printed circuitry ribbons can be cheaply made and then cut, creased, and fitted into or onto the busbars as shown in FIGS. 16 to 23.
4. Each busbar is no longer a flat bar with a simple rectangular cross-section, but instead is quite thicker as described in two improved embodiments elsewhere in this Specification. However, although the busbar in each embodiment is thicker, the depth of each total key-to-busbar assembly is less. This is because in the original key-to-busbar assembly the length of the key's stem was stacked on top of the busbar's depth (see FIG. 3A), but in the improved assemblies the key's stem and the busbar's depth are arranged side to side. Thus no matter how efficiently these components are otherwise made, the new assembly will be less deep than the old; unless the later assembly somehow causes the key's stem or plunger to lengthen, which here it doesn't.

Another aspect of these depth logistics is the relation between a key's stem length and its travel, that short but important vertical distance a key moves when it is activated. Typically a key's stem length equals its travel plus the length of its guides (the means by which the key is held in a vertical position as it travels). Thus if user ergonomics indicate that a keyboard key should have a travel of at least 2 mm (0.08 in.) to feel comfortable to most users and the length of its guides are added to this, the depth of the key's busbar can be considerably greater than one might think before it will increase the depth of the key-to-busbar assembly and thereby confer this added depth to the parent system as a whole. Thus it cannot be said of any computer on which this key-to-busbar assembly is mounted that the computer is made narrower at the expense of increasing its depth, no matter how great that depth may be for other reasons.

This improved key-to-busbar assembly allows the invention as a whole to be stronger, lighter, more attractive, more durable, and more economical than before. Both embodiments of this assembly are also more thoroughly and articulately described, which removes much of the anxiety that prospective manufacturers have previously expressed upon examining the Disclosed Invention.

As originally filed in this Invention's Patent and subsequently filed in its C.I.P. No. 1, the Disclosed Invention has its keyboard keys mounted in perfectly straight columns on its busbars in a \\\\\\ direction. But on a standard computer keyboard, each column of keys—say the 3-E-D-C keys—is not perfectly straight, which has led some commercial examiners of the Disclosed Invention to believe that the Disclosed keyboard when in open position might not duplicate normal typing as fully as is claimed.

But let's look at this seeming discrepancy more closely. If one lays a ruler along the upper right corners of the 3-E-D-C keys, or any other such column of keys on a standard keyboard, one will find that key E juts approximately 1.8 mm—about ¹⁄₁₆ in.—to the right of a line passing through the very corners of keys 3 and C while key D falls about 1.8 mm short of this line. Such offsets are probably the same on any standard keyboard.

Now on first thought one might say: simply put a few slight bends in the busbar. This adjustment, aside from increasing the cost of the invention a few cents, would not harm it in anyway.

Then on second thought one might say: instead of changing the busbar move the stems of the "E" row keys 1.8 mm to the right and move the stems of the "D" row keys 1.8 mm to the left. This adjustment would be as easy as changing the busbar and still would not harm the invention in any way.

Then on third thought one might say: would this little difference really affect one's typing that much? 1.8 mm is less than one-tenth the distance between the centers of two keys—hardly wider than a hangnail.

Then on fourth thought one might say: maybe the keyboard is better this way! Because, theoretically, if the keys are in a straight line, a touch-typist's fingers should be able to find them a tiny bit faster than if their alignment was even a little crooked.

Suffice it to say that whatever any further research indicates or any eventual manufacturer desires, any one of the three solutions outlined above can easily be implemented in the Invention's final embodiment.

As originally filed in this Invention's Patent, the Disclosed Invention shows the tops of its keys as being flat. But in a standard computer keyboard, each key typically has a slight side-to-side dish that enables a touch-typist's fingers to use the key more efficiently. Accordingly, the tops of the keys as shown in this Specification now have a slight lateral dish in their tops so they will look and/or operate more like standard keyboard keys.

As originally filed in this Invention's Patent and subsequently filed in its C.I.P. No. 1, the two side profiles of the keys in the Disclosed Invention have sharp points and indents. However, some examiners of the Disclosed Invention's original prototypes have expressed concern that such sharp 'sawtooth' or 'pinking shear' profiles may be tactilely and aesthetically undesirable to a considerable percentage of consumers. Accordingly, this Specification's latest Drawings shows the points and indents in the keys' side profiles as being rounder without reducing the indents' depth.

As originally filed in this Invention's Patent and subsequently filed in its C.I.P. No. 1, the Disclosed Invention has six rows of keys mounted on its laterally flexible assembly: row 1 which includes the function keys, row 2 which includes the number keys, row 3 which includes the q–p keys, row 4 which includes the a–l keys, row 5 which includes the z–m keys, and row 6 which includes several operational keys and the spacebar. However, there is a logistical reason why the first and sixth rows can possibly be left off the keyboard's laterally flexible assembly. This is because the keys in these rows are not often used in touch-typing. Thus, since the ability to touch-type at top speed on a very small computer is perhaps the biggest single advantage of the Disclosed Invention, for economic reasons a manufacturer may choose to exclude rows 1 and/or 6 from the keyboard's laterally flexible assembly and instead fix these rows on the body of the parent system just to the front or back of the other keys. In fact, because one usually looks at a function key when using it, the keys in row 1 could be narrowed until they fitted within the sides of a small computer. And by making the spacebar not quite as long, it too along with the control keys in its row could be fitted within the sides of a small computer.

As originally filed in this Invention's Patent and subsequently filed in its C.I.P. No. 1, the disclosed keyboard has been described only as an "input" device. However, there are numerous industrial applications for the Invention in which its "keys" could be indicator lights, LED displays, and even television or computer monitors—wherein such "keys" actually function as output activators. Indeed, almost every standard keyboard has a few output activators. For example, if one presses the caps lock key, a light usually appears on the keyboard: that light is an output activator. The same is true for the NUM LOCK light, SCROLL LOCK light, and several other tiny indicator lights that appear on most laptop keyboards. Thus in the Specification and claims of this Second Continuation In Part, the words "keyboard" and "key" connote both input and output; though input still has the stronger connotation. For these reasons the present Specification's broadest claim is for an "input/output device comprising a plurality of input/output activators", from which a narrower claim of a "keyboard in which said activators are alphanumeric/operational keys" depends.

Taking all the above into consideration, the primary advantage of the Disclosed Invention is that it allows 'laptop' and 'palmtop' computers and similar lightweight or mobile electronic devices with alphanumeric keyboards to be made nearly as small as a paperback or videocassette while allowing their keyboards to be used with the same skill and precision as those of full-size desktop computers. For example, with this Invention you can enter a conference with a computer hardly bigger than a paperback, open its keyboard, then while looking directly at someone talking you can touch-type at top speed. You can't perform this basic business activity on any other kind of computer. For a second example, with one hand you can reach for a paperback-sized computer on a surface several feet to your left, then with a broad sweep of this one hand you can carry this lightweight object to a place several feet to your right, then sit down and immediately begin touch-typing at top speed. If you tried this with a laptop you could dislocate your shoulder. Such a sweeping motion is a basic ergonomic movement which one cannot perform while holding any other kind of computer that has a full-size keyboard. In this and many other ways, the Disclosed Invention makes computers evanescently mobile, incredibly versatile, anytime, anywhere. Indeed, it makes the miniaturization of computers practical. Such economies of size should also lead to corresponding economies of price.

A further advantage of the Disclosed Invention is that its keys remain fully operable even when in closed position—an advantage that cannot be enjoyed with the above-cited U.S. Pat. Nos. 3,940,758 and 5,187,644. Thus the Disclosed Invention retains one of the greatest advantages of palmtop computers: that a standing user can easily hold such a device in a single hand while operating its keys with the other—and in so doing use the device while interviewing someone, inventorying shelved merchandise, walking down a hallway, or even while leaning against the rail of a moving walkway in an airport. But a standing user can also quickly sit down with such a petite computer, open its keyboard, and immediately begin touch-typing at top speed. Such standing-then-seated operation is another common business activity, one associated with taking notes then making a report, that cannot be performed with any other kind of computer.

A further advantage of the Disclosed Invention is that the deeply profiled edges of its individual keys may serve as a more tactile aid to a typist than the usual smooth-sided keys, which may actually lead to speedier and more accurate data entry.

A further advantage of the Disclosed Invention is that it should eliminate the tendency of present makers of palmtops and other small computers to remove certain keys which may be important to some users of desktop models in efforts to create a more compact keyboard.

A further advantage of the Disclosed Invention is that it allows computers of present desktop or laptop capability to be made much lighter. For example, the leanest laptop computers today still weigh two or three kilograms, which when carried in a traveler's shoulder bag for several hours can become quite uncomfortable; and such units certainly cannot be carried easily in one hand. On the other hand, several of today's palmtops—some of which have 16 MB of RAM, 256-color displays, PC card slots, serial interfaces, and built-in batteries and allow one to "run WINDOWS® windows anywhere" and communicate via Email—weigh less than 1 kilogram. Such units (typical dimensions=20× 12×3 cm) take up less than 20 percent of the volume of their typically 30×22×6 cm laptop cousins.

A further advantage of the Disclosed Invention is that the keys' deeply indented profiles may impart an eye-catching character to the device in which they are installed, which should make such devices highly marketable.

A further advantage of the Disclosed Invention is that it has more applications than being mounted on small computers, only a sampling of which are listed below:

1. Several companies and numerous individuals have expressed a desire to adapt the disclosed keyboard into a portable open-and-closed keyboard that can be connected to palm-sized pen-input devices, commonly known today as "PALMPILOTS®" and "PDAs", in which the Disclosed Invention would be hardly bigger than a cigarette case. Such a stand-alone keyboard would also make a nice accessory for owners of present handheld computers.

2. A maker of "ruggedized notepads", an electronic writing tablet about 5×8 inches in size, has expressed a desire to install the Disclosed Invention under his notepad's display, so users can pull the closed keyboard out from under the display then open it and begin typing as if they were at a desktop computer.

3. A numeric keypad could be added to the disclosed keyboard so that when closed the whole keyboard fits within the width of a laptop computer, and when open the laptop would have in addition to its standard keys a numeric keypad. A variation of this keyboard would also work as a portable cash register.

4. The Disclosed Invention's alphanumeric and operational keys could also be indicator lights, LED displays, even television or computer monitors, and they could be almost any size, and arrays of any combinations thereof could be configured as tightly arranged input/output activators mounted in auto or airplane dashboards, control room panels, and numerous industrial applications—then such arrays could pop forward with a slight touch and be opened into usable displays. Such open-and-close arrays would allow a greater number of controls to be installed in smaller instrument panel areas.

Although great latitude exists regarding the optimal sizing and configuring of many of the Disclosed Invention's various elements—for example the design and arrangement of keyboard keys, footprint dimensions of the keyboard when closed, method of conducting electricity from the keys to the parent system, nature of supporting the outermost keys when the keyboard is open, and many more details—in which any one of such various elements when considered individually may not necessarily represent a particular embodiment of its portion of the Invention as described herein, yet each of such various elements of the Disclosed Invention when considered collectively may be said to have one or more particular embodiments, as follows:

BRIEF DESCRIPTION OF THE DRAWINGS

FIG. 2 is a section through the parent computer or the like showing the front of the keyboard and its underlying laterally flexible assembly with their left halves shown in open position and their right halves in closed position.

FIG. 3 is a left side view of the keyboard and its underlying laterally flexible assembly shown in open position wherein their back and front edges when closed (1-C and 10-C) are shown in dotted lines. A right side view of this assembly is essentially a mirror image of the left side view.

FIG. 3A is an enlarged section thro' one of the laterally flexible assembly connectors which in this embodiment also serves as a positional guide and electrical contact between the keyboard and the parent system below, in which a typical schematic of the microcircuitry from any key to the parent system's operational circuitry is also shown.

FIGS. 6-OPEN and 6-CLOSED show open and closed views of a flexible flat ribbon which in this particular embodiment is connected to adjacent busbars in open and closed position.

FIGS. 7-OPEN and 7-CLOSED show open and closed views of a W-shaped flexible flat ribbon which in this particular embodiment is connected to adjacent busbars in open and closed position.

FIGS. 8-OPEN and 8-CLOSED show open and closed views of a wireless or infrared (IR) means of Conducting electricity which in this particular embodiment is situated between two adjacent busbars in open and closed position.

FIG. 9 is an enlarged top view of two adjacent busbars and the keys above that shows how the busbars' sides abut each other when the keyboard is closed in a manner that limits its minimum width and also maintains a slight space between the sides of any two adjacent keys.

FIGS. 10-OPEN and 10-CLOSED show open and closed views of two adjacent braces with integral hooks or latches on their sides which in this particular embodiment limit the keyboard's maximum width when it is open.

FIGS. 11-OPEN, 11-CLOSED and 11-SEC show open, closed, and sectional views of the rows of sliding slotted stops on the laterally flexible assembly's underside which in this particular embodiment limit the keyboard's maximum width when it is open. FIG. 11–54 is an enlarged view of one sliding slotted stop FIG. 12 includes four views of a spacebar handle assembly which in this particular embodiment enables the spacebar to lift up to facilitate opening and closing of the keyboard and/or press down to hold the keyboard secure when being used. FIG. 12-EXP is an exploded view of this assembly, FIG. 12-UP is a section thro' this assembly when the spacebar is up, FIG. 12-DOWN is a section thro' this assembly when the spacebar is down, and FIG. 12-SEC is a lateral section thro' this assembly when the spacebar is down.

FIGS. 13, DOWN and 13-UP are sections thro' the right and left halves of the spacebar that show a spring mechanism beneath it which moves this elongate key slightly upward when the keyboard is opened or closed.

FIGS. 14-OPEN and 14-CLOSED show open and closed views of an outrigger which in this particular embodiment supports the outer portions of the keyboard when it is open. FIG. 14-SEC is a section thro' the outrigger's inner end in closed position, and FIG. 14-END is an end view of the outrigger assembly in open or closed position.

FIGS. 15-OPEN and 15-CLOSED show open and closed views of a leg which in this particular embodiment supports the outermost portions of the keyboard when it is open. 15-END shows an end view of the leg as it appears in open or closed position.

FIG. 16A is a top view of a particular embodiment of a typical key-to-busbar assembly, and FIGS. 16B, 16C, and 16D are plan sections of the same.

FIG. 17 is an exploded perspective view of the same key-to-busbar assembly shown in FIG. 16, in which FIG. 17A is a worm's-eye (looking up) view of a key, FIG. 17B is a bird's-eye (looking down) view of a generally unitary portion of a printed circuitry ribbon, and FIG. 17C is a bird's-eye view of a similar portion of a busbar.

FIGS. 18A, 18B, 18C, and 18D are four lateral sections thro' the same key-to-busbar assembly shown in FIGS. 16 and 17.

FIGS. 19A, 19B, 19C, and 19D are four longitudinal sections thro' the same key-to-busbar assembly shown in FIGS. 16, 17, and 18.

FIG. 20A is a top view of a second embodiment of a typical key-to-busbar assembly, and FIGS. 20B, 20C, and 20D are plan sections of the same.

FIG. 21. is an exploded perspective view of the same key-to-busbar assembly shown in FIG. 20, in which FIG. 21a is a worm's-eye view of a key, FIG. 21B is a bird's-eye view of a generally unitary portion of a printed circuitry ribbon, and FIG. 21C is a bird's-eye view of a similar portion of a busbar.

FIGS. 22A, 22B, 22C, and 22D are four lateral sections thro' the same key-to-busbar assembly shown in FIGS. 20 and 21.

FIGS. 23A, 23B, 23C, and 23D are four longitudinal sections thro' the same key-to-busbar assembly shown in FIGS. 20, 21, and 22.

FIGS. 24A and 24B are four worm's eye perspective views of a keyboard key which shows four embodiments of the stem or prong projecting from the key's underside.

FIGS. 25A and 25B show two views of the electrical contacts under each key which close one or more electrical circuits between the key and the parent system when the key is depressed.

FIGS. 26A 2B and 26C are several views of the electrical contacts and a portion of a printed circuitry ribbon which close a circuit between each key and the parent system when the key is depressed.

FIG. 27 is a sampling of the great variety of input/output activators that can be mounted on the laterally-flexible assembly of the Disclosed Invention.

FIG. 28 is a drawing that describes the orthogonal terminology used in this Specification and its claims, in order that any confusion that may arise regarding certain directional aspects of the Disclosed Invention may be eliminated.

FIGS. 1 to 4 above appeared in the Disclosed Invention's original Patent, FIGS. 5 to 15 appeared in Continuation in Part No. 1, and FIGS. 16 to 25 appear as a previously undisclosed portion of this Continuation in Part No. 2.

In FIGS. 1 to 28 the following numbers and letters denote various parts and portions of the Disclosed Invention, wherein the same numbers and letters identify the same parts and portions throughout:
1. Keyboard, also input/output device. Left side in open position=1L-O. Right side in closed position=1-RC. Right side in open position=1R-O).
2. Individual key in keyboard 1, also input/output activator or activator. In FIG. 5 each key is also denoted by the actual letter it is typed and the letter is placed within a circle; i.e. the "T" key appears as Ⓣ. Position of key when keyboard is in open position=2-O. Position of key when keyboard is in closed position=2-C.
3. Longitudinal (front-to-back) depth of any key 2.
4. Total lateral (side-to-side) width of any key 2.
5. Side edge of key 2.
6. Indented side profile of key 2. Tips in indented profile 6=6T. Indents in indented profile 6=6I.
7. Minimum indent width of key 2.
8. Top or tactile surface of key 2.
10. Laterally flexible assembly. Left side in open position=10L-O. Right side in closed position=10R-C. Right side in open position=10R-O.
11. Spinebar: centermost busbar 12 in keyboard 1.
12. Busbar of laterally flexible assembly 10, also microbusbar or bar. Position of busbar when keyboard is open=12-O. Position of busbar when keyboard is closed=12-C. Indent in side of busbar=12-IS. Side(s) of busbar 12=12S. Substantially vertical guide surface(s) on side of busbar 12=12V.
14. Brace of laterally flexible assembly 10.
16. Connectors of busbar 12 and brace 14. Back connector=16B. Center connector=16C. Front connector=16F. Connector hole=16H.
17. Microcircuitry, also circuitry or microconductor. ~in Disclosed Invention=17U.~in parent system=17L.
18. Laterally flexible assembly handles. Left handle in open position=18L-O. Right handle in closed position=18R-C.
19. Indent on each laterally flexible assembly handle 18.
20. Computer body, also computer frame, frame of computer, frame of parent system, or frame of computer or other electronic system. Top of~=20T. Indent that receives spacebar handle assembly 60=20-I.
21. Surface that parent system is situated on, also parent system's resting surface, surface that supports parent system as it is being used, computer's resting surface, surface that supports computer as it is being used, etc.
22. Back of computer frame 20.
24. Side of computer frame 20. Left side=24L. Right side=24R.
25. Outrigger encasement: portion of parent system body 20 that envelopes sliding inner end of outrigger 90 when outrigger 90 is in closed position. Encasement void=25V.
26. Front of computer or parent system frame 20.
27. Back keyboard supports, also upper keyboard support. Left side in open position=2L-O. Right side in open position=27R-O.
28. Front keyboard supports, also lower keyboard support. Left side in open position=28L-O. Right side in open position=28R-O.
29. Keyboard support indent in side of computer or parent system body 20.
33. Projecting positional guide on underside of connector 16F.
34. Indented positional guides in computer or parent system chassis 35. Guide that receives projecting guide 33 when keyboard is in open position=34-O. Guide that receives projecting guide 33 when keyboard is in closed position=34-C.
35. Computer or parent system chassis.
36. Shaft of connector 16.
37. Flange or boss of connector 16.
38. Bushing around shaft 36 of connector 16.
39. Circuitry inside computer or parent system body 20.
40. Flexible flat ribbon. Also flexible flat cable or flexible flat ribbon conductor.
42. Plug at end of flexible flat ribbon conductor.
44. W-shaped flexible flat ribbon conductor. Also W-shaped flexible flat ribbon.
46. Plug at end of W-shaped flexible flat ribbon conductor.
48. Infrared (IR) or wireless driver microchip with drive circuit, also driver microchip or driver chip.
49. Infrared (IR) or wireless photodiode. Sender photodiode=49S. Receiver photodiode =49R.
50. Integral hook or latch on side of brace 15.
51. Indent on side of hook 50.
52. Projecting face in side of hook 50 that mates with indented surface 53 in side of adjacent or interlocking hook 50.
53. Indented surface in side of hook 50 that receives projecting face 52 in side of adjacent or interlocking hook 50.
54. Sliding slotted stop, also slotted stop, sliding stop, or stop. Web of~=54W. Flange of~=54F.
55. Screw or similar connector that fastens sliding slotted stop 54 to brace 14.
56. Elongate hole in end opposite hole 57 in web 54W of sliding slotted stop 54.
57. Hole in end opposite elongate hole 56 in web 54W of sliding slotted stop 54.
58. Trench in computer or parent system top 20T that provides riding room for sliding slotted stops 54.
60. Spacebar handle mechanism or assembly.
62. Spacebar, also spacebar key or key. This part is also number SB.
64. Spacebar base. Upper flange=64UF. Lower flange=64LF.
66. Double torsion spring in lower flange 64LF of spacebar base 64.
68. Shaft that fits into lower flange 64LF of spacebar base 64.
69. Connector between spacebar base 64 and handle 70.

Figure 1:
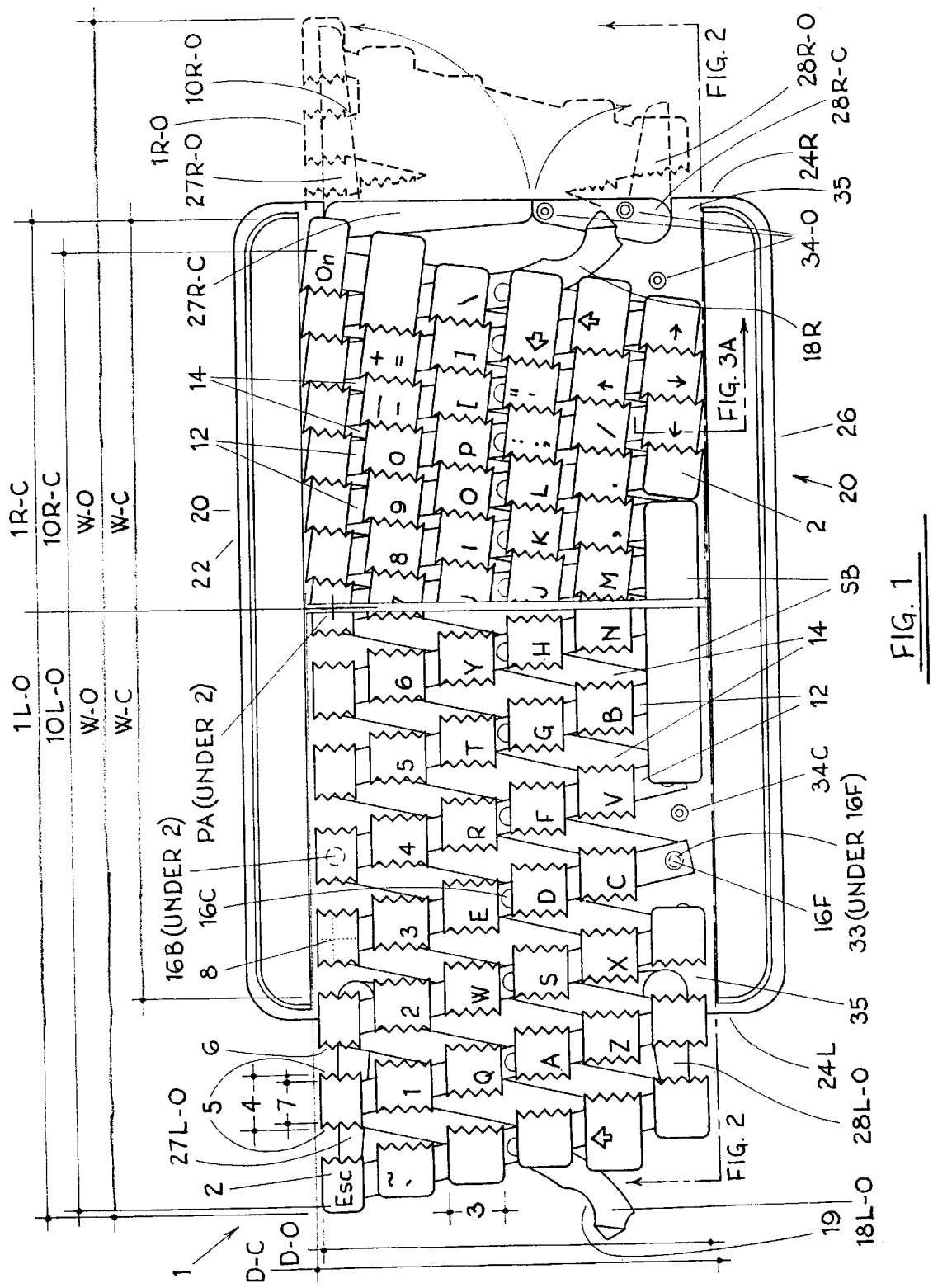
FIG. 1 is a top view of the keyboard and its underlying laterally flexible assembly with its left half in open (expanded) position and its right half in closed (contracted) position.

70. Handle that raises or lowers spacebar 62. Handle lever= 70F.
72. Spacers between handle 70 and handle base 74.
74. Handle base. Notch=74N. Downward-projecting catch= 74C.
76. Handle case. Side flanges=76F.
78. Catch spring in handle case 76.
82. Spring/catch mechanism beneath spacebar 62.
83. Upper catch descending from underside of spacebar key 62 that engages lower catch 84. Upper face that mates with lower face 84L=83U. Lower face that mates with upper face 84U=83L.
84. Lower catch rising from computer or parent system top 20 that engages upper catch 83. Upper face that mates with lower face 83L=84U. Lower face that mates with upper face 83U=84L.
86. Spring that pushes spacebar 62 up.
88. XY decoder located in parent system 20.
90. Outrigger that supports outermost keys 2 when in open position. Inner or sliding end=90-I. Outer or supporting end=90-O.
92. Connector between outrigger 90 and underside of laterally flexible assembly 10.
96. Leg that supports outermost keys 2 when open. Top= 96T. Shaft=96S. Foot=96F.
98. Connector of leg 96 to underside of laterally flexible assembly 10.
102. Longitudinal guides under sides of key 2. Longitudinal guide under left side of key 2=102-L. Longitudinal guide under right side of key 2=102-R.
103. Dish or concavity in lateral (side-to-side) dimension of key 2.
112. Longitudinal guides on top of busbar 12. Longitudinal guide on top of left side of busbar 12=112-L. Longitudinal guide on top of right side of busbar 12=102-R.
114. Intermittent projection(s) along the tops of busbar 12.
116. Busbar prong rising from busbar 12 or extending from busbar prong flange 136. Widened base of busbar prong 116=116B. Projection(s) on busbar prong 116=116P. Sloping surface on busbar prong projection 116P that mates with sloping surface 118S on key prong projection 118P=116S.
118. Key prong descending from the underside of key 2. Projection(s) on end of key prong 118=118P. Sloping surface on key prong projection 118P that mates with sloping surface 116S on busbar prong projection 116P= 118S.
119. Fin(s) or projection(s) along key prong 118.
120. Key guide(s) or key guide surface(s) located on busbar 12. Widened base of key guide 120=120B.
121. Fin(s) projecting along the length of key prong 118.
122. Pendant descending from key 2.
124. Electrical contacts located on tip of pendant 122 or underside of key 2.
126. Inset in computer or parent system body 20 that receives outrigger 90. Inset that receives leg 96=126L.
127. Extensive (as opposed to compressive) elastic member that depresses when key 2 is activated and returns key 2 to its normal position after being activated. Also elastic member.
128. Buttress between key guides 120. Peak of buttress= 128P. Sloping upper side(s) of buttress=128S. Vertical key guide surface on a buttress 128=128V.
130. Printed circuitry ribbon that conducts electronic data from each key 2 to end of busbar 12 toward parent system circuitry 39.
131. Microconductor(s) in printed circuitry ribbon 130.
132. Open circuitry terminals in printed circuitry ribbon 130 that are closed by electrical contacts 124 on underside of key 2 when key 2 is depressed or activated. Individual or multiple contacts in open circuitry terminal 132=132C. Sheet of nonconductive material in open circuitry terminal 132=132P.
133. Slot that accepts and holds in place the bottom of printed circuitry ribbon 130.
134. Cavity or cavities in busbar 12 located below intermittent projection(s) 114.
135. Cavity or cavities in busbar 12 located below key prong(s) 118.
136. Prong flange that rises from shelf 138 and supports busbar prongs 116. Vertical key guide surface on the end of prong flange 136=136V.
138. Shelf that extends from side of busbar 12 and supports prong flange 136.
140. Post that rises from shelf 138 and holds in place the bottom of elastic member 127.
141. Rounded surface(s) that enclose elastic member 127 on busbar 12.
142. Cavity beneath buttress 128.
144. Layer of adhesive between circuitry ribbon and top of busbar.
146. Cavities on each side of shelf 138.
150. Wider projections on fins 119.
152. Spacer between open circuitry terminal 132 and electrical contact 124.
158. Column of input/output activators or keys 2 in input/output device or keyboard 1.
160. Hexagonal activators in tiled plane shown in FIG. 27A.
162. Indicator lights on activators shown in FIG. 27.
164. First regular polygonal activator shown in FIG. 27B.
166. Second regular polygonal activator shown in FIG. 27B.
168. Rhomboidal activators shown in FIG. 27C.
170. Parallelogramic activators shown in FIG. 27E.
172. Decorative polygonal activators shown in FIG. 27F.
174. Television or computer monitor shown in FIG. 27G.
175. Controls on television or computer monitor 174.
176. Slider control shown in FIG. 27H.
177. Spring-activated pop-up scale on slider control 176.
178. Small plunger on the underside of slider control 176.
A. Top view of standard keyboard key.
D–O. Longitudinal depth (front-to-back dimension) of keyboard 1 when open.
D–C. Longitudinal depth (front-to-back dimension) of keyboard 1 when closed.
CL. Closed position of innermost part of outrigger inner end 90-O.
G. Gap between spacebar's normal resting position and its lowermost position during normal typing activity.
H. Height of chamber that houses elastic member 127 between key 2 and busbar 12.
OP. Open position of innermost part of outrigger inner end 90-O.
PA. Pivot anchor of keyboard 1 and laterally flexible assembly 10 under key F7.
S. Small space between the sides of two keys 2 when keyboard 1 is closed.
SB. Spacebar in central front part of keyboard 1. This part is also number 62.
W–O. Lateral width (side-to-side dimension) of keyboard 1 when open.
W–C. Lateral width (side-to-side dimension) of keyboard 1 when closed.
X. X or row (generally lateral) microconductors in microcircuitry 17 (these conductors are also numbered X1, X2, X3 . . . X6). Also conductors or wires.

Y. Y or column (generally front-to-back) conductors in microcircuitry 17 (these conductors are also numbered Y1, Y2, Y3 . . . Y7). Also conductors or wires.

DETAILED DESCRIPTION AND OPERATION OF THE INVENTION

Referring to the accompanying Drawings that describe a particular embodiment of the Disclosed Invention in detail and initially to FIG. 1 thereof: This top view shows the left half of keyboard 1 and its underlying laterally flexible assembly 10 in extended or open position and its right half in contracted or closed position, wherein the division between the two half views occurs at the centrally located pivot anchor PA, wherein each key 2 (not including space bar SB in the bottom row) has a typical alphanumeric or operational notation on its top or tactile surface 8. In this view, the keyboard's front-to-back dimension decreases only slightly from D–C to D–O as its lateral or side-to-side dimension increases greatly from W–C to W–O when the keyboard is extended from closed to open position. This figure also shows in dotted lines the outline of the right half of said keyboard when it is open (1R-O and 10R-O) and the outlines of the two legs 27R-O and 28R-O that extend from the parent system's right side to support this side of the keyboard when it is open.

Referring to keyboard 1: each key 2 has a front-to-back depth 3, total side-to-side width 4, and side edges 5, wherein at least one of side edges 5 has an indented profile 6 that allows two adjacent keys to interlock at an indent width 7 which is less than the key's total width 4. Indent width 7 allows keys 2 to have the same center-to-center spacing as standard keyboard keys when keyboard 1 is in open position while allowing the center-to-center spacing of keys 2 to be much less when keyboard 1 is in closed position. Regarding spacebar SB, this elongate key centered in the front row of keyboard 1 is connected to computer body front 20F so its tactile surface remains stationary whether all the other keys 2 are opened or closed, since such extension of keys 2 causes said keys 2 to rotate slightly (which is desirable for them as explained further below) while such rotation is undesirable for the elongate spacebar SB. However, in other equally valid embodiments, part of spacebar SB can be rotatably anchored to part of underlying laterally flexible assembly 10 while another part of spacebar SB is slidably anchored to another part of assembly 10.

Referring to the keys' laterally flexible assembly 10: this multiple-X network is constructed primarily of substantially planar and parallel busbars 12 (whose backs in FIG. 1 are oriented slightly to the left of their fronts: i.e. \\\\\\), a similar but not necessarily exact number of braces 14 (whose back ends in FIG. 1 are oriented slightly to the right of their front ends: i.e. //////), and three rows of connectors 16 located where the backs of busbars 12 and braces 14 intersect (connectors 16B), where their centers intersect (connectors 16C) and where their fronts intersect (connectors 16F). Busbars 12 support keys 2 mounted thereon and include the microcircuitry that conducts electronic data from any activated key 2 to the parent system's circuitry 39, while braces 14 are made of a material that adequately stabilizes busbars 12 and supports keys 2 when keys 2 are activated. Connectors 16 intertransfer the required stability between braces 14 to busbars 12, allow busbars 12 to rotate against braces 14 when keyboard 1 is opened or closed, and carry the microcircuitry that conducts electronic data from any depressed key 2 to the parent system's circuitry 39.

In this embodiment, the back connector 16B approximately under key F7 (the centermost key in the top row of keys) descends to form an essentially vertical pivot anchor PA that keeps the keyboard connected to the parent system and holds the portion of keyboard 1 at point PA stationary while the keys to the right and left of this point are opened or closed; wherein the upper portion of pivot anchor PA allows its proximate busbar 12 and brace 14 to rotate slightly about said vertical axis while the lower portion of pivot anchor PA is anchored in the computer body 20 that underlies laterally flexible assembly 10. In other embodiments, pivot anchor PA can be located at the bottom of the total keyboard/laterally flexible assembly instead of the top.

In this embodiment, keyboard 1 and laterally flexible assembly 10 are positioned accurately when in open or closed position by projecting positional guides 33 on the undersides of connectors 16F, wherein all of guides 33 mate with a row of indented positional guides 34-C located on computer body 20 when laterally flexible assembly 10 is in closed position, and all of guides 33 mate with another row of indented positional guides 34-O on computer body 20 when laterally flexible assembly 10 is in open position. In other embodiments, guides 33 and 34 can be located under the top of laterally flexible assembly 10 instead of at the bottom.

In this embodiment, positional guides 33 and 34 also conduct electronic data from any depressed key 2 to the parent parent system's circuitry 39 through electrical contacts located on the mating surfaces of guides 33 and 34. This is shown in FIG. 3A, an enlarged section through a front connector 16F which includes a schematic of the microcircuitry between key 2 and the parent system's circuitry 39, wherein microconductors 17U conduct electronic data from any depressed key 2 through busbar 12, brace 14, connector 16F, and projecting positional guide 33 to microcircuitry 17L in indented positional guide 34 and eventually parent system's circuitry 39. In other embodiments, electronic data from keys 2 can be conducted through back connectors 16B instead of front connectors 16F, or said conductance could occur via wireless means (i.e. infrared or remote control) directly from keys 2 or busbars 12 to the parent system's circuitry 39.

In this embodiment, the rightmost busbar 12 and leftmost brace 14 of assembly 10 extend toward the keyboard's front to form two handles 18R and 18L which facilitate the opening and closing of keyboard 1, wherein each handle 18 has indents 19 that allow the tips of one's fingers to more easily grasp the ends of handles 18. In other embodiments handles 18 could have indents, pads, projections, or any combination thereof that would further facilitate the opening and closing of keyboard 1.

Referring to computer body 20 around and under keyboard 1: although computer body 20 can have many sizes and configurations (or even lack thereof), in this embodiment computer body 20 has two back keyboard supports 27L and 27R and two front keyboard supports 28L and 28R. Back supports 27L and 27R extend from the vicinity of computer body 20's back left and right corners to provide support for the rearmost and outermost keys 2 when keyboard 1 is in open position, while front supports 28L and 28R extend from the vicinity of computer body 20's front left and right corners to provide support for the frontmost and outermost keys 2 when keyboard 1 is in open position. In this embodiment, front keyboard supports 28L and 28R also have on their tops the outermost indented positional guides 34 that receive the corresponding projecting positional guides 33 on the underside of laterally flexible assembly 10 when keyboard 1 is in open position.

Referring to FIG. 2 of the Drawings: This frontal section shows the left half of keyboard 1 and laterally flexible assembly 10 in open position and the right half in closed position. In particular this view shows keys 2 mounted on the plurality of busbars 12, the plurality of braces 14 just below, projecting positional guides 33 that mate with indented positional guides 34 (outlined in dotted lines) located in computer body 20, and left keyboard supports 27L-O and 28L-O in open position. The right half of this view shows in dotted lines the open position of keyboard 1R-O, laterally flexible assembly 10R-O, and right keyboard braces 27R-O and 28R-O.

Referring to FIG. 3 of the Drawings: This left side view of the keyboard 1 and laterally flexible assembly 10 in open position shows the leftmost keyboard keys 2 mounted on the leftmost busbar 12, leftmost brace 14 just below which includes projecting handle 18L-O, left keyboard supports 27L-O and 28L-O in open position, and the leftmost projecting positional guide 33 which mates with the leftmost indented positional guide 34-O (shown in dotted lines) in computer body 29. Also shown in dotted lines is the leftmost indented positional guide 34-C in computer body 20 which receives said projecting positional guide 33 when the keyboard/scissor linkage assembly is in closed position. This view also shows in dotted lines the position of keyboard 1-C and laterally flexible assembly 10-C in closed position. A right side view of this assembly is essentially a mirror image of the left side view.

Referring to FIG. 3A of the Drawings: As explained above, this is an enlarged section through a front connector of the keyboard's laterally flexible assembly.

Figure 4:
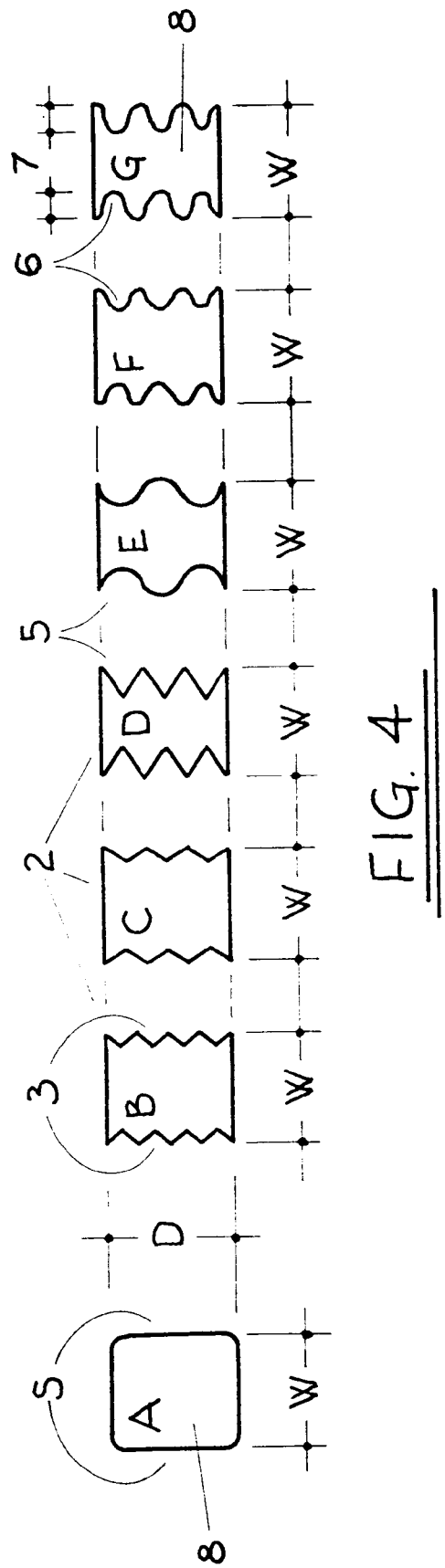
FIG. 4 shows top views of several individual keys, wherein key A is of standard shape while the other keys to the right have side edges with various interlocking profiles as typified in the Disclosed Invention.

Referring to FIG. 4 of the Drawings: In this top view of several keyboard keys, key A is an outline of a typical 'Chicle' style key from a standard computer keyboard. Note the rectangular aspect of key As top surface, its standard depth or front-to-back dimension D, its standard width or side-to-side dimension W, and its straight side edges. Then note that the other keys to the right have the same depth and width as key A, but their sides have various indented profiles 6 which allow any two of said other keys having matching profiles to interlock so their centers will be closer together than could occur with two side-to-side keys A. These keys can have a variety of other configurations without any diverging from the nature of what has been described herein.

Figure 5:
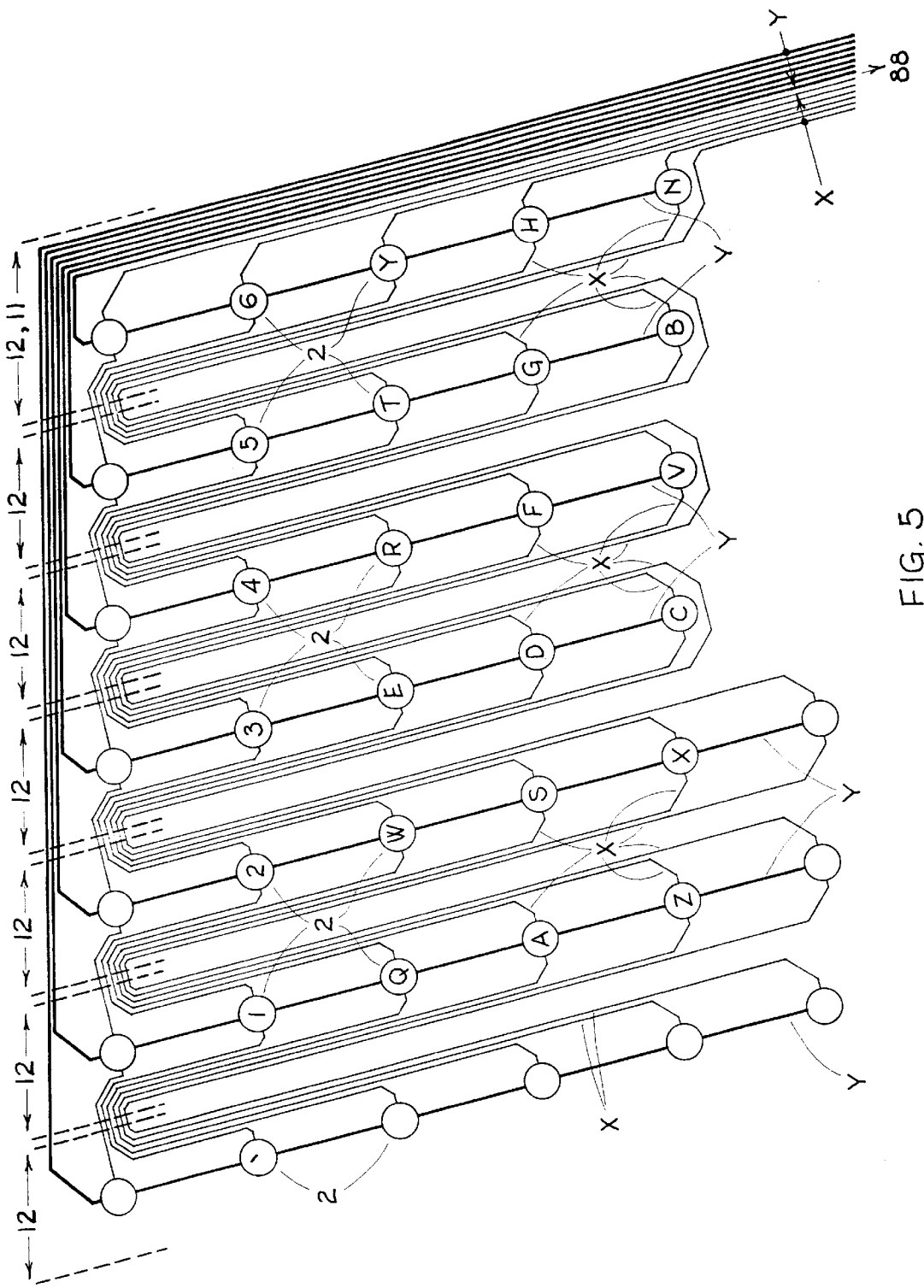
FIG. 5 is a microcircuitry diagram of essentially the left half of the keyboard: i.e. the spine bar (the bar that supports keys F6 6 Y H N) and the keys to its left. The microcircuitry map of the keys to the right of the spine bar is essentially a mirror image of the keys to the left.

Referring to FIG. 5 of the Drawings: This is a microcircuitry diagram of the left side of keyboard 1 including spinebar 11 (the microcircuitry on the right of keyboard 1 is essentially a mirror image of that on the left). In this top view keys 2 and busbars 12 are located somewhat as they would be on an actual keyboard 1; however, the alphanumeric keys are shown not as they actually look but as circles containing the character which each key represents, and the circles for the nonalphanumeric keys are left blank. Also, busbars 12 are shown in partial dotted lines, and spine bar 11 is shown as wider than the other busbars 12 so the larger number of conductors in this busbar may be clearly portrayed, even though in most embodiments spine bar 11 has the same width as the other busbars 12.

In this microcircuitry diagram, each microconductor or wire X conducts electronic data from a horizontal row of keys 2 to each busbar 12 to each adjacent busbar 12 to the spine bar 11 to XY decoder 88 inside computer body 20; and each microconductor or wire Y conducts electronic data from a near-vertical (i.e. \\\\\\\\) row of keys 2 to each busbar 12 to each adjacent busbar 12 to spine bar 11 to XY decoder 88. This microcircuitry in whole or in part can have a variety of other configurations without any of them diverging from the nature of what has been described herein.

Referring to FIG. 6 of the Drawings: This includes two perspective views of a flexible flat ribbon 40, which in this embodiment conducts electronic data between two adjacent busbars 12 whether they are open or closed, wherein the ends of flexible flat ribbon 40 are attached to plugs 42 located beneath the back ends of adjacent busbars 12. FIG. 6-OPEN shows ribbon 40 in a somewhat flat configuration when adjacent busbars 12 are in open position while3 FIG. 6-CLOSED shows ribbon 40 in a looped configuration when adjacent busbars 12 are in closed position. Thus electronic data from the several keys 2 mounted on any busbar 12 is conducted through a series of flexible flat ribbons 40 from busbar to busbar toward spinebar 11 whether keyboard 1 is open or closed. Also shown in these views are braces 14 below busbars 12. This conductor's related assembly in whole or in part can have a variety of other configurations without any diverging from the nature of what has been described herein.

Referring to FIG. 7 of the Drawings: This includes two perspective views of a W-shaped flexible flat ribbon 44, which in this embodiment conducts electronic data between any two adjacent busbars 12 whether they are open or closed (this conductor can also be located between any two adjacent braces), wherein the ends of W-shaped flexible flat ribbon 44 are attached to plugs 42 located between adjacent side indents 12-IS in adjacent busbars 12. FIGS. 7-OPEN shows ribbon 40 extended between adjacent side indents 12-IS when adjacent busbars 12 are in open position while FIG. 7-CLOSED shows ribbon 40 compactly configured between indents 12-IS when adjacent busbars 12 are in closed position. These two views also show how the various folds in flexible flat ribbon 44 enable it to open and close flexibly while remaining in nearly the same plane that it expands and contracts. Such conductors can have numerous kinds of folds or pleats to achieve the same flexible conductance of which the one shown is only an example, and this conductor can have a variety of other configurations without any diverging from the nature of what has been described herein.

Referring to FIG. 8 of the Drawings: This includes two perspective views 8-OPEN and 8-CLOSED of a wireless or infrared (IR) means of conducting electricity, which in this embodiment conducts electronic data between any two adjacent busbars 12 whether busbars 12 are open or closed, wherein said conductance proceeds from any one busbar 12 to a driver microchip 48 located beneath the end of busbar 12, from where chip 48 activates a contiguous infrared sender diode 49S that transmits electronic data through the air—i.e. wirelessly—to an infrared receiver diode 49R similarly mounted on adjacent busbar 12, from where the electronic data is conducted similarly from busbar to busbar toward spine bar 11. This infrared assembly can be located almost anywhere along busbars 12 or even braces 14, as long as sender photodiode 49S and receiver photodiode 49R face generally toward each other when they are in open or closed position. This infrared assembly can have a variety of other configurations without any diverging from the nature of what has been described herein.

Referring to FIG. 9 of the Drawings: This is a top view of part of keyboard 1 in closed position, wherein the adjacent sides of two busbars 12 abut each other and maintain a small space S between the narrower keys 2 above. Thus the widths of busbars 12 determine the minimum width of keyboard 1 when it is closed and keep the sides of any two adjacent keys 2 from touching each other which keeps a depressed key from activating another. These assemblies can have a variety of other configurations without any diverging from the nature of what has been described herein.

Referring to FIG. 10 of the Drawings: This includes two views of two adjacent braces 14 with integral hooks or latches 50 on their sides, which in this embodiment limit the maximum width of keyboard 1 when it is open. In FIG. 10-CLOSED the ends of hooks 50 are nested in indents 51 in the sides of adjacent braces 14 as keyboard 1 is closed; then as keyboard 1 opens, the ends of each pair of hooks 50 move toward each other, until in FIG. 10-OPEN their ends catch on each other to prevent keyboard 2 from opening any wider, and this establishes the 19 mm pitch of keys 2 when they are open. Such catching of said hooks 50 also eliminates a phenomenon described earlier in this Specification as "linkage-lag", wherein if hooks 50 or similar limiting device are not present, as keyboard 1 is opened its outermost keys 2 tend to open too wide before the innermost keys start to spread apart. FIG. 10-SEC is a section thro' hooks 50 in closed position wherein each adjacent hook 50 has a projecting face 52 that mates with an indented surface 53 in opposing hook 50 to ensure the hooks' planar alignment as they come together. This hooking mechanism can be on almost any part of braces 14, and it can have a variety of other configurations without any diverging from the nature of what has been described herein.

Referring to FIG. 11 of the Drawings: This includes four views of a series of sliding slotted stops 54 located on the underside of braces 14 which in this embodiment limit the maximum width of keyboard 1 when it is open. FIG. 11–54 is a perspective view of sliding slotted stop 54 which is made of a thin strong rustproof material, whose channel-like shape has an inner web 54W between two side flanges 54F, wherein one end of web 54W has an elongate hole 56 and the other end has a round hole 57 whose diameter is the same as the width of elongate hole 56. In FIG. 11-OPEN and 11-CLOSED, each hole 56 and 57 receives two connectors 55 that loosely fasten the ends of stop 54 to the undersides of two braces 14 so the connector in elongate hole 56 can slide freely back and forth as keyboard 1 opens and closes. Thus when each pair of connectors 55 in each sliding stop 54 are their maximum distance apart as in FIG. 11-OPEN, keyboard 1 can open no wider, and this establishes the standard 19 mm pitch of keys 2 when they are open. Sliding stops 54 also eliminate the above-described linkage-lag which tends to occur as keyboard 1 is opened if stops 54 or similar limiters are not present. Operation of the Disclosed Invention's working prototypes revealed that stops 54 did not need to be connected to every pair of adjacent braces to eliminate the above-described linkage-lag, that connection to every other brace was adequate. FIG. 11-SEC. is a section thro' keyboard 1, laterally flexible assembly 10, and sliding stops 54 that shows a shallow trench 58 in computer top 20T that provides riding room for sliding stops 54 as keyboard 1 opens and closes. The plurality of sliding slotted stops 54 can connect to braces 14 anywhere along their undersides, they can be connected in more than two rows, and they can have a variety of other configurations without any diverging from the nature of what has been described herein.

Referring to FIG. 12 of the Drawings: This includes four views of a spacebar handle mechanism 60, which in this embodiment either raises spacebar 62 to facilitate opening and closing of keyboard 1 or lowers spacebar 62 to clamp keyboard 1 securely in place when it is open or closed. Spacebar handle mechanism 60 includes an angular spacebar base 64 below spacebar 62 which contains an upper flange 64UF and lower flange 64LF, a double torsion spring 66 which has a looped stop in its center and fits into lower flange 64LF, a shaft 68 which fits into lower flange 64LF and holds spring 66 in place, a handle 70 whose back edge is located adjacent to spacebar 62 and whose front edge has a slightly projecting lever 70F, a handle base 74 which is located below handle 70 and has a deep notch 74N and downward-projecting catch 74C, two spacers 72 which fit between handle 70 and handle base 74 to form grooves between the sides of parts 70 and 74, a wirelike connector 69 with hooks on each end that joins handle base 74 to spacebar base 64, a somewhat box-like handle case 76 which contains a catch spring 78 and has two side flanges 76F that fit into two grooves between the sides of handle base 74 and handle base 76, and computer indent 20-T which receives handle case 76 and other portions of spacebar handle mechanism 60.

FIG. 12-EXP is an exploded view of spacebar handle mechanism 60 which shows how it lifts or lowers adjacent spacebar 62 as follows: when one pulls lever 70F of handle 70 from the front of keyboard 1, this action pulls handle base 74 and connector 69 frontward which pulls frontward the edged portion of spacebar base 64 that lies between its upper and lower flanges 64UF and LF, which, because the base of lower flange 64LF is held in place by shaft 68, leverages the far end of upper flange 64UF and spacebar 62 upward. While handle base 74 is moving frontward its downward-projecting catch 74C rides over a hump in catch spring 78 below, depressing this spring, then after catch 74C has passed over this hump, spring 78 rises to prevent catch 74C from returning to its original position, wherein this stoppage keeps spacebar 62 in "up" or "lift" position. Next, by pushing lever 70F of handle 70 back toward keyboard 1 with slightly more force than was exerted during the earlier-described frontward action, downward-projecting catch 74C rides again over the hump in catch spring 78, whereupon double torsion spring 66 in lower flange 62LF forces spacebar 62 down with enough pressure to make spacebar 62 hold keyboard 1 securely in place. These movements are further clarified by FIG. 12-UP, a section thro' the spacebar handle assembly when spacebar 62 is up, FIG. 12-DOWN, a section thro' the spacebar handle assembly when spacebar 62 is down, and FIG. 12-SEC, a lateral section thro' the handle assembly when spacebar 62 is down. Although the operation of spacebar handle mechanism 60 has been described in considerable detail above, each portion of this assembly and the assembly as a whole can have a variety of other configurations without any diverging from the nature of what has been described herein.

Referring to FIG. 13 of the Drawings: This includes two sectional views of a spring/catch mechanism 82 beneath spacebar 62, FIG. 13-DOWN thro' their left halves when in down position, and FIG. 13-UP thro' their right halves when in up position. In this embodiment, spring/catch mechanism 82 beneath spacebar 62 moves this elongate key slightly upward to facilitate the opening and closing of keyboard 1. Mechanism 82 includes two upper catches 83 which descend from the underside of spacebar 62 on each side of XY decoder 88 (or other interior portion of computer 20) and which have faces 83U and 83L, two lower catches 84 which rise from computer body top 20T on each side of XY decoder 88 and which have faces 84U and 84L, and two springs 86 on each side of XY decoder 88 which apply a slight extensive force between the underside of spacebar 62 and computer top 20T.

Sectional view 13-DOWN shows spring/catch mechanism 82 and spacebar 62 above in down" or normally operable position, wherein upper face 83U of upper catches 83 mates with lower face 84L of lower catch 84; and sectional view 14-UP shows spring/catch mechanism 82 and spacebar 62 in "up" position, wherein lower face 83L of upper catch 83 mates with upper face 84U of lower catch 84. Faces 83U, 83L, 84U, and 84L are angled so that only a slight pressure against the underside of spacebar 62 (i.e. the top front ends of busbars 12 pressing the overlapping edges of spacebar 62 upward as keyboard 1 is lifted slightly when it is opened or closed) makes the outer edges of catches 83 and 84 (which have slightly flexible shafts) slip past each other in a way that makes spacebar 62 move upward, but a similar pressure on top of spacebar 62 forces spacebar 62 back down to its operating position. The strength of springs 86 also urges this up-down action as desired. When spacebar 62 is in operating position, springs 86 also maintain a slight gap G between spacebar 62 and its lowermost position when it closes an electric circuit (not shown) during normal typing activity. Spring/catch mechanism 82 can have a variety of other configurations without any of them diverging from the nature of what has been described herein.

Referring to FIG. 14 of the Drawings: This includes four views of an outrigger 90 located under each corner of keyboard 1 to support the outermost portions of keyboard 1 when it is open. There are four outriggers 90, each of which has a substantially horizontal inner end 90-I that slides into an encasement 25 in computer body 20, a substantially vertical outer end 90-O under a corner of keyboard 1 that supports keyboard 1 when it is open, and a structurally appropriate cross-section (shown in this embodiment as an inverted T). Encasement 25 has a void 25V that envelopes outrigger 25's cross-section in a manner that supports inner end 90-I when only part of end 90-I remains in void 25V when keyboard 1 is open (wherein the innermost part of end 90-I is located at OP) and also allows inner end 90-I to slide snugly within the length of void 25V until virtually all of inner end 90-I is within void 25V when keyboard 1 is closed (wherein the innermost part of end 90-I is located at CL). A connector 92 fastens the top 90-I of each outrigger's outer end 90-O to the underside of laterally flexible assembly 10 in a way that supports a corner of keyboard 1 when it is open and allows outer end 90-O to rotate slightly about its vertical axis as keyboard 1 opens and closes. Also, the side of computer 20 contains an inset 126 that largely encloses outer end 90-O of outrigger 90 when keyboard 1 is closed. Sectional view 14-CLOSED shows outrigger 90 and its related parts when keyboard 1 is closed, sectional view 14-OPEN shows the same parts when keyboard is open, end view 14-END shows how outrigger 90 fits into inset 126 when keyboard 1 is closed, and section 14-SEC shows how inner end 90-I fits snugly and slidably in void 25V of encasement 25. In these views the means by which electricity is conducted from one busbar 12 to the next are omitted for clarity. Outrigger 90's shape and related assembly can have a variety of other configurations without any diverging from the nature of what has been described herein.

Referring to FIG. 15 of the Drawings: This includes three views of a leg 96 situated under each corner of keyboard 1 which in this embodiment supports the outer portions of keyboard 1 when it is open. Each of four legs 96 has a top 96T which is connected by connector 98 to laterally flexible assembly 10, a shaft 96S which structurally supports keyboard 1 when it is open and resists lateral sliding forces at its base as keyboard 1 is opened or closed, and a foot 96F that lies on the parent system's resting surface 21 and whose round underside rides over any rough areas in surface 21 as keyboard 1 opens or closes. Section 15-OPEN shows leg 96 and its related parts when keyboard 1 is open, section 15-CLOSED shows the same parts when keyboard is closed, and end view 15-END shows how leg 96 fits snugly and slidably into inset 26L of computer body 20 when keyboard 1 is closed. In these views the means by which electricity is conducted from one busbar 12 to the next are omitted for clarity. Leg 96's shape and related assembly can have a variety of other configurations without any diverging from the nature of what has been described herein.

Referring to FIG. 16 of the Drawings: This includes a top view 16A and three plan sections 16B, 16C, and 16D of a particular embodiment of key 2 and busbar 12 in which key 2 is in depressed or activated position. In all situations, mirror images of this embodiment are as valid as the ones shown.

FIG. 16A is a top view of key 2 and the portion of busbar 12 below that lies between two rows of keys 2. In this view, (1) the tips 6T and indents 61 in the two indented side profiles 6 of this embodiment of key 2 are round instead of being pointed as they appear in FIG. 1 of the Drawings, (2) the location of an adjacent key 2 when keyboard 1 is open is shown in dotted lines to the left of key 2 at 2-O and the location of an adjacent key 2 when keyboard 1 is closed is shown in dotted lines to the right of key 2 at 2-C, and (3) the small space between any two adjacent keys 2 when keyboard 1 is closed is denoted by the letter S.

The plan section of FIG. 16B is taken just above the top of busbar 12 when key 2 is in depressed or activated position. This view shows (1) the outline of the top or tactile surface 8 of key 2 in dotted lines, (2) left and right longitudinal key guides 102-L and 102-R and the adjacent outermost portions of key 2 located under the top of key 2, which lie below this section and thus appear as isolated sections, (3) left and right longitudinal busbar guides 112-L and 112-R on the tops of busbar 12 that align with guides 102-L and 102-R under key 2 when key 2 is depressed, (4) projections 114 located intermittently along the inside top edges of busbar 12 where they hold circuitry ribbon 130 in busbar 12 (the relationship between projections 12B and circuitry ribbon 130 is more visible in FIG. 18A), (5) a trough-like central area in busbar 12 from which rises busbar prongs 116 to engage key prongs 118 descending from the underside of key 2 to hold key 2 in place on busbar 12, (6) the snug confinement of two key prongs 118 by two key guides 120 that assure the smooth and accurate travel of key 2, (7) a centrally located cylindrical pendant 122 which (a) descends from key 2, (b) has a locus of electrical contacts 124 on its tip (not shown) that close an electrical circuit between key 2 and the parent system's circuitry 39 when key 2 is depressed, and (c) is surrounded by a small coil spring, hollow rubber grommet, or similar elastic member 127 that keeps key 2 poised in unactivated position, and (8) buttress 128 between two longitudinally adjacent key guides 120 which laterally strengthens guides 120 and forms an inverted base for any connectors 16 that descend from this portion of busbar 12 to connect busbar 12 to brace 14, and (9) a peak 128P on buttress 128 which forms two sloping sides 128S that urge the shedding of any dust and other microdebris that may settle in this vicinity of keyboard 1.

The plan section of FIG. 16C is taken at the level of a locus of open circuitry terminals 132 situated beneath pendant 122 (shown in dotted lines) and is essentially a "floor plan" of the trough-like central area of busbar 12. This view shows (1) the outline of top or tactile surface 8 of key 2 in dotted lines, (2) the location of elastic member 127 around open circuitry terminals 132, (3) open circuitry terminals 132 situated between two circuitry ribbons 130 in the sides 125 of busbar 12, (4) the engaging of key prongs 118 and busbar prongs 116 as key 2 moves up and down, (5) the snug confinement of key prongs 118 by key guides 120 as key 2 moves up and down, and (6) the backs of key guides 120 laterally supported by buttresses 128 as key 2 moves up and down.

The plan section of FIG. 16D is taken near the bottom of busbar 12 and shows (1) the outline of tactile surface 8 of key 2 in dotted lines, (2) cavities 134 located below intermittent projections 114, and (3) cavities 135 located below key prongs 118.

Referring to FIG. 17 of the Drawings: In these three exploded perspective views of the key-to-busbar assembly shown in FIG. 16, FIG. 17A is a worm's eye view of key 2 and FIGS. 17B and 17C are bird's eye views of generally unitary portions of printed circuitry ribbon 130 and busbar 12, wherein the anatomy of these three components are portrayed more comprehensively than can be shown in top or side views alone. In these views elastic member 127 that fits between each key and busbar 12 below to keep key poised in its normal position when it is not being activated is not shown for clarity.

Figure 18:
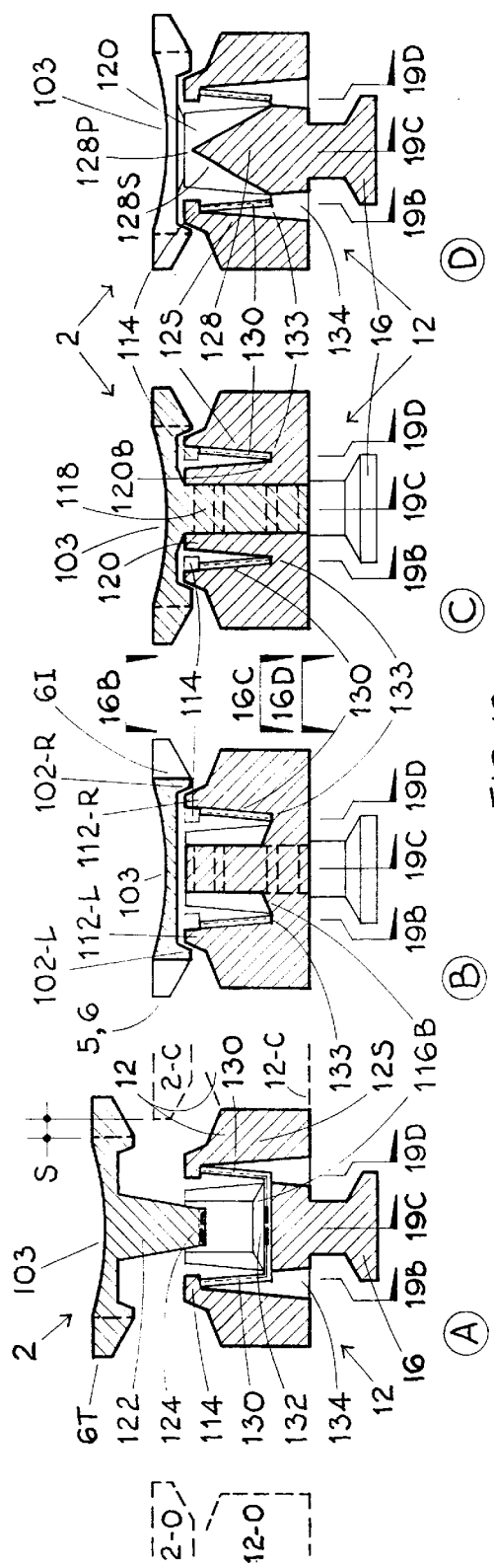

Referring to FIG. 18 of the Drawings: In these four lateral sections thro' the same key-to-busbar assembly shown in FIGS. 16 and 17, the sections are taken as described below. In these sections a number of dotted lines which show hidden portions of this assembly are omitted for clarity.

Section 18A is taken thro' pendant 122 under key 2 and open circuitry terminals 132 in the trough-like central portion of busbar 12 when key 2 is poised in unactivated position. This view shows (1) the maximum width of key 2 thro' its projecting tips 6T in its two indented side profiles 6, (2) the concavity 103 in the top of key 2, (3) the locations of adjacent key 2-O and busbar 12-O in dotted lines to the left of key 2 when keyboard 1 is in open position and the locations of adjacent key 2-C and busbar 12-C in dotted lines to the right of key 2 when keyboard 1 is closed position, (4) the slight space S between the interlocking profiles of two adjacent keys 2 created by the abutting sides of adjacent busbars 12, (5) projections 114 located intermittently along the upper edges of each printed circuitry ribbon 130 to hold each ribbon 130 in busbar 12, (6) a locus of electrical contacts 124 on the tip of pendant 122 located above a locus of open circuitry terminals 132 extending from two printed circuitry ribbons 130 on each side so that when key 2 is depressed, electrical contacts 124 close one or more circuits with open circuitry terminals 132 between key 2 and the parent system's circuitry 39, (7) cavity 134 which enables the underside of each projection 114 to be formed by an upward portion of the plastic-injection mold that forms busbar 12, and (8) connector 16 which may be located on the underside of this portion of busbar 12 to join busbar 12 to brace 14.

Section 18B is taken between the engaging surfaces of busbar prong 116 rising from the inner area of busbar 12 and key prong 118 descending from key 2 when key 2 is in depressed or activated position. This view shows (1) the minimum width of key 2 at indents 61 in its indented side profiles 6, (2) concavity 103 in the top of key 2, (3) the aligning of left and right longitudinal busbar guides 112-L and 112-R on the top portions of busbar 12 with longitudinal guides 102-L and 102-R under key 2 for purposes of guiding key 2 when it is depressed, (4) two slots 133 which receive and hold in place the bottoms of printed circuitry ribbon 130 between the widened base 116B of busbar prong 116 and the sides 125 of busbar 12, and (5) projections 114 located intermittently along the inside top edges of busbar 12 where they hold in place the tops of printed circuitry ribbon 130.

Section 18C is taken thro' key prong 118 descending from the underside of key 2 and key guide 120 rising from busbar 12 when key 2 is in depressed or activated position. This view shows (1) the top portion of key 2 moved slightly off-center to the left so the relation of this key (i.e. the "E" key and the others in its row) to others in its column may be the same as on a standard keyboard, (2) concavity 103 in the top of key 2, (3) key guide 120 snugly confining key prong 118 to assure the smooth and accurate travel of key 2, (4) slots 133 which receive and hold in place the bottoms of printed circuitry ribbon 130 between the widened base 120B of key guide 120 and the sides 125 of busbar 12, and (5) projections 114 located intermittently along the tops of busbar 12 where they hold in place the tops of printed circuitry ribbon 130.

Section 18D is taken thro' the part of busbar 12 that includes buttress 128 when key 2 is in depressed or activated position. This view shows (1) an end view of the upper portion of key 2 which includes concavity 103 in the top of key 2, (2) the top portion of key 2 moved slightly off-center to the right so the relation of this key (i.e. the "D" key and the others in its row) to others in its column may be the same as on a standard keyboard, (3) key guide 120 below key 2 and above an end of buttress 128, (4) peak 128P of buttress 128 which forms two sloping sides 128S that urge any dust or microdebris settling on or near this area of keyboard 1 to slide through cavities 134 below projections 114, and (5) a connector 16 which may be located on the underside of this portion of busbar 12 to join busbar 12 to brace 14.

Figure 19:
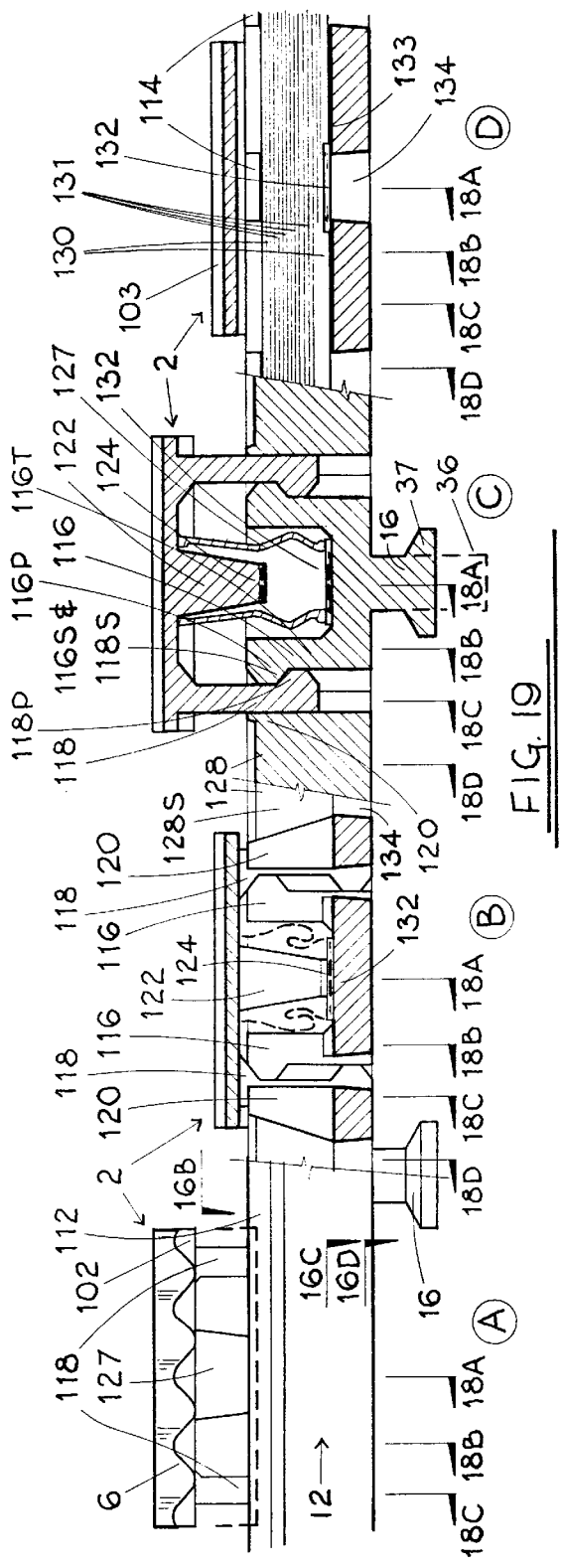

Referring to FIG. 19 of the Drawings: This includes a side elevation 19A and three longitudinal sections 19B, 19C, and 19D thro' the same key-to-busbar assembly shown in FIGS. 16, 17, and 18, wherein the four views are spaced at generally the same intervals as are the rows of keys 2 on keyboard 1 to indicate the proper front-to-back spacing between these rows. These views are taken as follows:

Section 19A is a side elevation of key 2 and busbar 12 when key 2 is poised in unactivated position, and it shows (1) the indented side profile 6 of key 2 and its nearmost longitudinal guide 102 below, (2) the upper portions of the sides of key prongs 118 and elastic member 127 beneath the top of key 2, (3) longitudinal busbar guide 112 on top of busbar 12, and (4) connector 16 which may be located beneath the area of buttress 128 to join busbar 12 to brace 14.

Section 19B is taken thro' the nearest portion of the trough-like central area of busbar 12 when key 2 is in depressed or activated position. This view shows (1) the upper portion of key 2, (2) a side view of pendant 122 and a locus of electrical contacts 124 on its tip mating with a locus of open circuitry terminals 132 to close one or more circuits between key 2 and the parent system's circuitry 39 when key 2 is depressed, wherein the outer surface of elastic member 127 is shown in dotted lines for clarity, (3) a side view of key prongs 118 descending from the underside of key 2 and busbar prongs 116 rising from busbar 12, (4) key guide 120 snugly confining key prong 118 to assure the smooth and accurate travel of key 2, and (5) sloping side 128S of buttress 128 which urges any dust or microdebris settling on or near this part of busbar 12 to slide through cavity 134 and away from busbar 12.

Section 19C is taken thro' the center of busbar 12 when key 2 is poised in unactivated position. This view shows (1) the upper portion of key 2, (2) a locus of electrical contacts 124 on the tip of pendant 122 situated above a locus of open circuitry terminals 132 so that when key 2 is depressed, electrical contacts 124 descend and mate with open circuitry terminal 132 to close one or more circuits between key 2 and the parent system's circuitry 39, (3) the full height of elastic member 127 when key 2 is poised in unactivated position, (4) busbar prongs 116 engaging key prongs 118 when key 2 is in unactivated position, wherein two projections 116P and 118P on the ends of prongs 118 and 116 form a catch to keep key 2 from moving further upward when in unactivated position and allows key 2 to be removed for purposes of servicing it and the busbar area below by a forceful upward leverage against the key's underside, wherein sloping surface 118S on projection 118P of key prong 118 pushes against a mating sloping surface 116S on projection 116P of busbar prong 116 and thus deflects busbar prong 116 enough to allow projection 118P to ride past projection 116P, and (5) connector 16 which may be located on the underside of this portion of busbar 12 to join busbar 12 to brace 14. In this embodiment there are two structurally optimal locations along the underside of busbar 12 for connectors 16: under-.the area of open circuitry terminals 132 and under buttress 128. In this embodiment connector 16 is injection-molded integrally with busbar 12 and has a cylindrical shaft 36 (shown in dotted lines) which extends from under busbar 12, then shaft 36 is inserted through a hole in brace 14 and its end is heat-softened to create a flange or boss 37 that fills a mating countersunk void in brace 14 in a manner that enables brace 14 to rotate snugly around connector 16. However, in other equally valid embodiments connector 16 could be a separate screw or rivet fastened to the underside of busbar 12.

Section 19D is taken thro' the furthest portion of the trough-like central area of busbar 12 when key 2 is in depressed or activated position. This view shows (1) the furthest portion of key 2 above the top of busbar 12, (2) concavity 103 in the top of key 2, (3) intermittent projections 114 along the tops of printed circuitry ribbon 130 and slots 133 along the bottom of ribbon 130, where projections 114 and slots 133 hold ribbon 130 in busbar 12, and (4) the location of cavities 134 below intermittent projections 114 which urge any dust or microdebris settling in or near the area above to fall away from busbar 12 and enable the portion of the plastic-injection mold of busbar 12 that forms the underside of projections 114 to retract when said mold is split apart.

Referring to FIG. 20 of the Drawings: This includes a top view 20A and three plan sections 20B, 20C, and 20D of a second embodiment of the Invention's key-to-busbar assembly. This second embodiment is especially relevant because it evinces the same principles of functionality in a much different way than does the embodiment of FIGS. 16 to 19. For example, the prongs, guides, and pendant of key 2 are all pronouncedly off-center; the prongs, guides, contacts, connectors, and cross-section of busbar 12 are also pronouncedly off-center; prongs 116 are situated on a much different base; the meeting of electrical contacts 124 and open circuitry terminals 132 occurs not at the base of key 2 but beneath one of its sides; and printed circuitry ribbon 130 is in one piece instead of two halves and is located on the top of one side of busbar 12 instead of in a central depression. Indeed, the great difference between this "side-saddle" embodiment of FIGS. 20 to 23 and the "symmetrical" embodiment of FIGS. 16 to 19 indicates the wide range of variety that embodiments of this key-to-busbar assembly as well as the Invention as a whole can have. Also, mirror images of this embodiment are as valid as the ones shown.

FIG. 20A is a top view of key 2 and the portion of busbar 12 below that lies between two rows of keys 2. This view shows (1) the position of an adjacent key 2 when keyboard 1 is open in dotted lines to the left of key 2 at 2-O and the position of an adjacent key 2 when keyboard 1 is closed in dotted lines to the right of key 2 at 2-C, (2) a locus of electrical contacts 124 in dotted lines under the top of key 2, and (3) a small space 5 between two adjacent keys 2 when keyboard 1 is closed.

The plan section of FIG. 20B is taken just above the top of busbar 12 when key 2 is poised in unactivated position. This view shows (1) the top of key 2 above outlined in dotted lines, (2) a top view of busbar 12, (3) two key prongs 118 and integral fins 121 descending from key 2 and which are snugly confined by vertical guide surfaces 136V on the ends of two prong flanges 136, surfaces 12V on busbar 12, and surfaces 128V on two buttresses 128 to assure the smooth and accurate travel of key 2, (4) printed circuitry ribbon 130 and open circuitry terminals 132 on busbar 12 below electrical contacts 124 (not shown) under the side of key 2, (5) a substantially cylindrical post 140 rising from shelf 138 that extends from the side of busbar 12, wherein post 140 is circumferenced by a coil spring, hollow grommet, or similar elastic member 127 which returns key 2 to its normal position after it has been depressed, (6) two round surfaces 141 which partly enclose elastic member 127 to minimize the area occupied by member 127 while still allowing member 127 to flex up and down freely, (7) a substantially longitudinal prong flange 136 which rises from shelf 138 and from whose ends extend busbar prongs 116 that engage two key prongs 118 descending from the underside of key 2 to hold key 2 in place on busbar 12, and (8) buttresses 128 between adjacent key prongs 118 of two longitudinally adjacent keys 2 where they add strengthen busbar 12.

The section of FIG. 20C is taken thro' post 140 in busbar 12 and is essentially a "floor plan" of the area that supports elastic member 127. This view shows (1) the top of key 2 above in dotted lines, (2) key prongs 118 and integral fins 121 snugly confined by vertical guide surfaces 136V on prong flanges 136, surfaces 12V on busbar 12, and surfaces 128V on buttresses 128 to assure the smooth and accurate travel of key 2, (3) the engaging of key prongs 118 descending from key 2 by prong flanges 136 extending from busbar prongs 116 rising from shelf 138 to hold key 2 in place on busbar 12, (4) post 140 rising from shelf 138 and circumferenced by elastic member 127 which returns key 2 to its normal or unactivated position after it has been depressed, (5) two round surfaces 141 which partly enclose elastic member 127 to minimize the area occupied by member 127 while allowing it to flex up and down freely, and (6) buttresses 128 between adjacent key prongs 118 of two longitudinally adjacent keys 2.

The plan section of FIG. 20D is taken just above the bottom of busbar 12, and it shows (1) the top of key 2 above in dotted lines, (2) key prongs 118 and integral fins 121 snugly confined by vertical guide surfaces 136V on two prong flanges 136, surfaces 12V on busbar 12, and surfaces 128V on buttresses 128 to assure the smooth and accurate travel of key 2, (3) the outline of shelf 138 and prong flange 136, and (4) a cavity 142 below buttress 128 which lightens this part of busbar 2 in a way that slightly lowers its cost and weight without appreciably reducing its strength.

Referring to FIG. 21 of the Drawings: This includes two exploded perspective views of the key-to-busbar assembly shown in FIG. 20. FIG. 21A is a worm's eye view of key 2 and FIG. 21B is a bird's eye view of a generally unitary portion of printed circuitry ribbon 130 and busbar 12, wherein the anatomy of these components are portrayed more comprehensively than in top or side views alone. In these views elastic member 127 which fits between each key and the busbar below and keeps the key poised in unactivated position is not shown for clarity.

Figure 22:
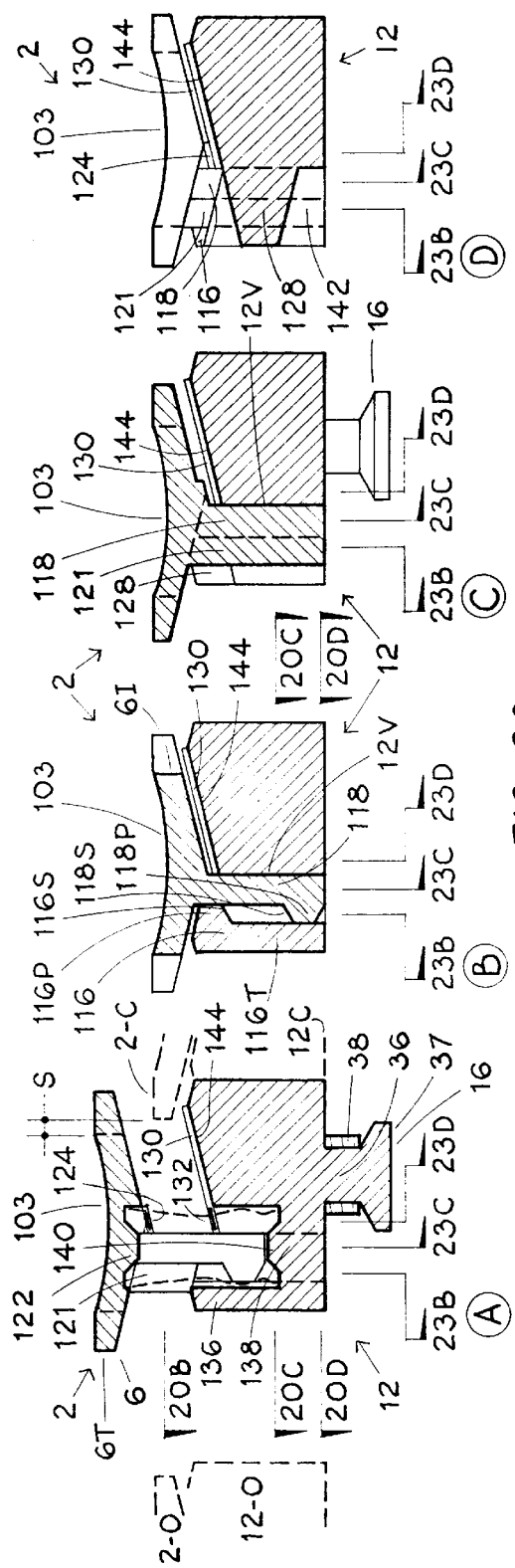

Referring to FIG. 22 of the Drawings: These are four lateral sections thro' the same key-to-busbar assembly shown in FIGS. 20 and 21, and are taken as described below. In these sections a number of dotted lines which show hidden portions of this assembly are omitted for clarity.

Section 22A is taken thro' the central portion of key 2 and the part of busbar 12 below when key 2 is poised in unactivated position. This view shows (1) the maximum width of key 2 through the projecting tips 6T in its indented side profiles 6, (2) concavity 103 in the top of key 2, (3) the location of adjacent key 2-O and busbar 12-O in dotted lines to the left of key 2 when keyboard 1 is in open position and the location of adjacent key 2-C and busbar 12-C in dotted lines to the right of key 2 when keyboard 1 is closed position, (4) the slight space S between two adjacent keys 2 created by the abutting sides of adjacent busbars 12 when keyboard 1 is closed, (5) a locus of electrical contacts 124 situated beneath one side of key 2 and above a locus of open circuitry terminals 132 in printed circuitry ribbon 130 on busbar 12 so that when key 2 is depressed, electrical contacts 124 descend and mate with open circuitry terminals 132 to close one or more electrical circuits between key 2 and the parent system's circuitry 39, (6) adhesive 144 between circuitry ribbon 130 and busbar 12, (7) pendant 122 which descends from key 2 and aligns with post 140 rising from shelf 138 to hold elastic member 126 in place, (8) the structurally integral relation between busbar 12, shelf 138, and prong flange 136, (9) connector 16 which in this embodiment may be located anywhere along the underside of busbar 12, and (9) a metal bushing 38 around shaft 36 of connector 16 between its flange or boss 37 and the underside of busbar 12 which in this embodiment reduces the wear that possibly tens of thousands of rotation cycles could inflict on shaft 36 during its rated life if it were made of plastic, wherein one method of fitting shaft 36 onto connector 16 is to insert the molded staking of connector 16 through bushing 38 before fitting connector 16 into its brace and heat-softening its end to create boss 37.

Section 22B is taken thro' key 2 when it is in depressed or activated position and the portion of busbar 12 that includes busbar prong 116 engaging key prong 118 descending from key 2. This view shows (1) the minimum width of key 2 thro' indents 6T in its indented side profiles 6, (2) concavity 103 in the top of key 2, (3) the manner in which the projections 116P and 118P form a catch to keep key 2 from moving further upward when it is poised in unactivated position and allows key 2 to be removed for purposes of servicing it and the keyboard area below by a forceful upward leverage against the key's underside, wherein a sloping surface 118S on projection 118P of key prong 118 pushes against a mating sloping surface 116S on projection 116P of busbar prong 116 and thus deflects busbar prong 116 enough to allow projection 118P to ride past projection 116P, (4) the location of printed circuitry ribbon 130 attached to busbar 12 with adhesive 144, and (5) key guide surface 12V of busbar 12 snugly confining key prong 118 to assure the smooth and accurate travel of key 2.

Section 22C is taken thro' key prong 118 and integral fins 121 of key 2 and the adjacent portion of busbar 12 when key 2 is in depressed or activated position. This view shows (1) the top of key 2 moved off-center to the left so the relation of this key (i.e. the "E" key and the others in its row) to others in its column may be the same as on a standard keyboard, (2) concavity 103 in the top of key 2, (3) the location of printed circuitry ribbon 130 attached to the top of busbar 12 with adhesive 144, (4) the snug confinement of key prong 118 by key guide surface 12V of busbar 12 which assures the smooth and accurate travel of key 2, (5) the outermost portion of buttress 128 projecting beyond fin 121 of key 2, and (6) connector 16 which in this embodiment may be located anywhere along the underside of busbar 12.

Section 22D is taken thro' the portion of busbar 12 that includes buttress 128 when key 2 is in depressed or activated position. This view shows (1) an end view of the exposed upper portion of key 2 which includes concavity 103 in its top, (2) the top portion of key 2 moved off-center to the right so the relation of this key (i.e. the "D" key and the others in its row) to others in its column may be the same as on a standard keyboard, (3) the location of printed circuitry ribbon 130 attached to the top of busbar 12 with adhesive 144, (4) the contiguously sloping tops of busbar 12 and buttress 128 which urge the shedding of any dust or microdebris which may settle in this vicinity of busbar 12, and (5) cavity 142 beneath buttress 128.

Figure 23:
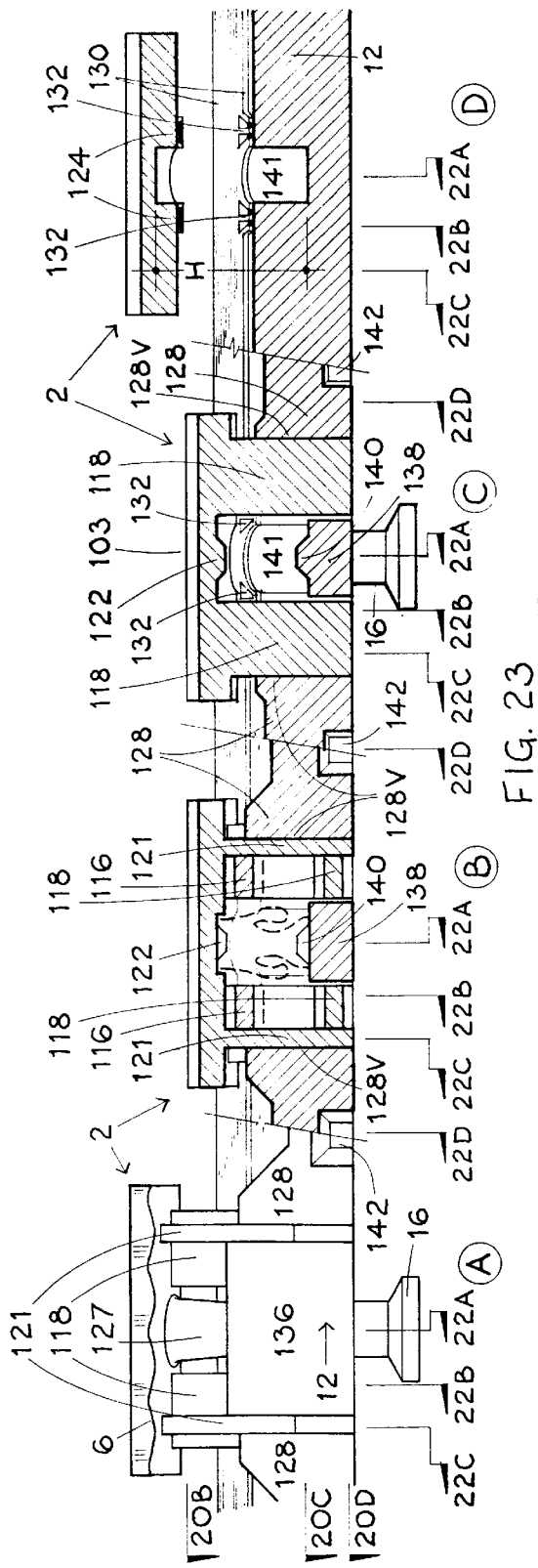

Referring to FIG. 23 of the Drawings: This includes a side elevation 23A and three longitudinal sections 23B, 23C, and 23D thro' the same key-to-busbar assembly shown in FIGS. 20, 21, and 22, wherein the four views are spaced at generally the same intervals as the rows of keys 2 on keyboard 1 to indicate the proper front-to-back spacing between said rows of keys 2. These views are taken as follows:

FIG. 23A is a side elevation of key 2 when it poised in unactivated position and a generally unitary portion of busbar 12 below. This view shows (1) the indented side profile 6 of key 2, (2) the upper portions of key prong 118, integral fins 121, and elastic member 127 beneath the top of key 2, (3) the outer face of prong flange 136, (4) the outer corners of buttresses 128 which snugly confine the outer portions of key guides 118, (5) cavity 142 beneath buttress 128, and (6) a connector 16 which in this embodiment may be located anywhere under busbar 12 to join busbar 12 to brace 14.

Section 23B is taken thro' integral fin 121 of key 2 and busbar prongs 116 of busbar 12 when key 2 is in depressed or activated position. This view shows (1) the alignment of busbar prongs 116 with key prongs 118 in their longitudinal dimensions, (2) the snug confinement of key prongs 118 by key guide surfaces 128V on buttresses 128 which assures the smooth and accurate travel of key 2, (3) the location of pendant 122 on the underside of key 2 above post 140 rising from shelf 138 on busbar 12, (4) the location of elastic member 127 between key 2 and shelf 138, wherein only the outline of member 127 in depressed position is shown in dotted lines for clarity, and (5) buttresses 128 and cavities 142 below.

Section 23C is taken thro' the center of pendant 122 descending from key 2 and post 140 rising from shelf 138 of busbar 12 when key 2 is in depressed or activated position. This view shows (1) the upper portion of key 2 which includes concavity 103 in its top, (2) the chamber that houses elastic member 127 when it is in depressed position wherein member 127 has been removed for clarity, (3) the inner parts of a locus of open circuitry terminals 132 above rounded surface 141 and between key prongs 118, (4) the longitudinal width of key prongs 118 descending from key 2, (5) the snug confinement of key prongs 118 by key guide surfaces 128V on buttresses 128 which assures the smooth and accurate travel of key 2, (5) the location of buttresses 128 between adjacent rows of keys 2 and cavities 142 below, and (6) connector 16 beneath shelf 138 which in this embodiment may be anywhere on the underside of busbar 12.

Section 23D is taken thro' the portion of busbar 12 that lies between post 140 and rounded surface 141 when key 2 is in unactivated position. This view shows (1) the upper portion of key 2 appearing as an isolated section beyond the section cut, (2) a locus of electrical contacts 124 under key 2 above a locus of open circuitry terminals 132 on busbar 12, wherein when key 2 is depressed, electrical contacts 124 descend and mate with open circuitry terminals 132 to close one or more circuits between key 2 and the parent system's circuitry 39, (3) a side view of a generally unitary portion of printed circuitry ribbon 130 with the locus of open circuitry terminals 132 along its lower edge, (4) rounded surface 141 below the locus of open circuitry terminals 132, (5) the full height H of the chamber that houses elastic member 127 when key 2 is poised in unactivated position, and (6) the most solid mass of busbar 12.

Referring to FIG. 24 of the Drawings: This includes worm's eye views of four embodiments of key prong 118 that descend from key 2. Each key prong 118 has four fins 119; but in FIG. 24A fins 119 are integrally connected and uniformly wide from top to bottom and have a locus of electrical contacts 124 on their tips; while in FIG. 24B fins 119 are as in FIG. 24A but electrical contacts 124 are near their bases on the underside of key 2; then in FIG. 24C fins 119 are integrally connected but have wider projections 150 near their tops and electrical contacts 124 are on projections 150; and in FIG. 24D fins 119 are integrally connected only near their tops and electrical contacts 124 are inside their separate lengths near their tops. Any other embodiments of key prongs 118, projections 119, and electrical contacts 124 that have other combinations of connectivity and projections are as valid as the embodiments shown.

Referring to FIG. 25 of the Drawings: This shows two embodiments of two pair of electrical contacts 124 mounted on pendant 122 descending from key 2 so that each opposing pair of contacts 124 can be connected to each other without contacting the other pair. For example, in FIGS. 25A and 25B, contacts $124-X_1$ and $124-X_2$ are connected to each other while contacts $124-Y_1$ and $124-Y_2$ are connected to each other but none of the "X" contacts touch any of the "Y" contacts. Any other embodiments of contacts 124 that have a similar XX/YY connectivity and no XY nonconnectivity are as valid as the ones shown.

Referring to FIG. 26 of the Drawings: This shows three means of printing open circuits 132C on a thin sheet 132P of a flexible nonconductive material such as acrylic plastic. In FIG. 26A, open circuit 132C is on the side of sheet 132P facing electrical contacts 124 on the tip of pendant 122 descending from key 2 so that when key 2 is depressed, electrical contacts 124 press against sheet 132P which closes circuit 132C. In FIG. 26B, open circuit 132C is printed on the far side of sheet 132P from pendant 122 and electrical contacts 124 are also on the far side of sheet 132P, wherein circuits 132C and electrical contacts 124 are kept from touching electrical contact 124 by spacers 152 when key 2 is poised in unactivated position. Then when key 2 is depressed, pendant 122 presses sheet 132P and circuit 132C on its far side into electrical contact 124 which closes circuit 132C. FIG. 26C is FIGS. 26A and 26B combined, wherein open circuits 132C are printed on both sides of plastic sheet 132P; then when key 2 is depressed both circuits are closed as described in FIGS. 26A and 26B.

Figure 27:
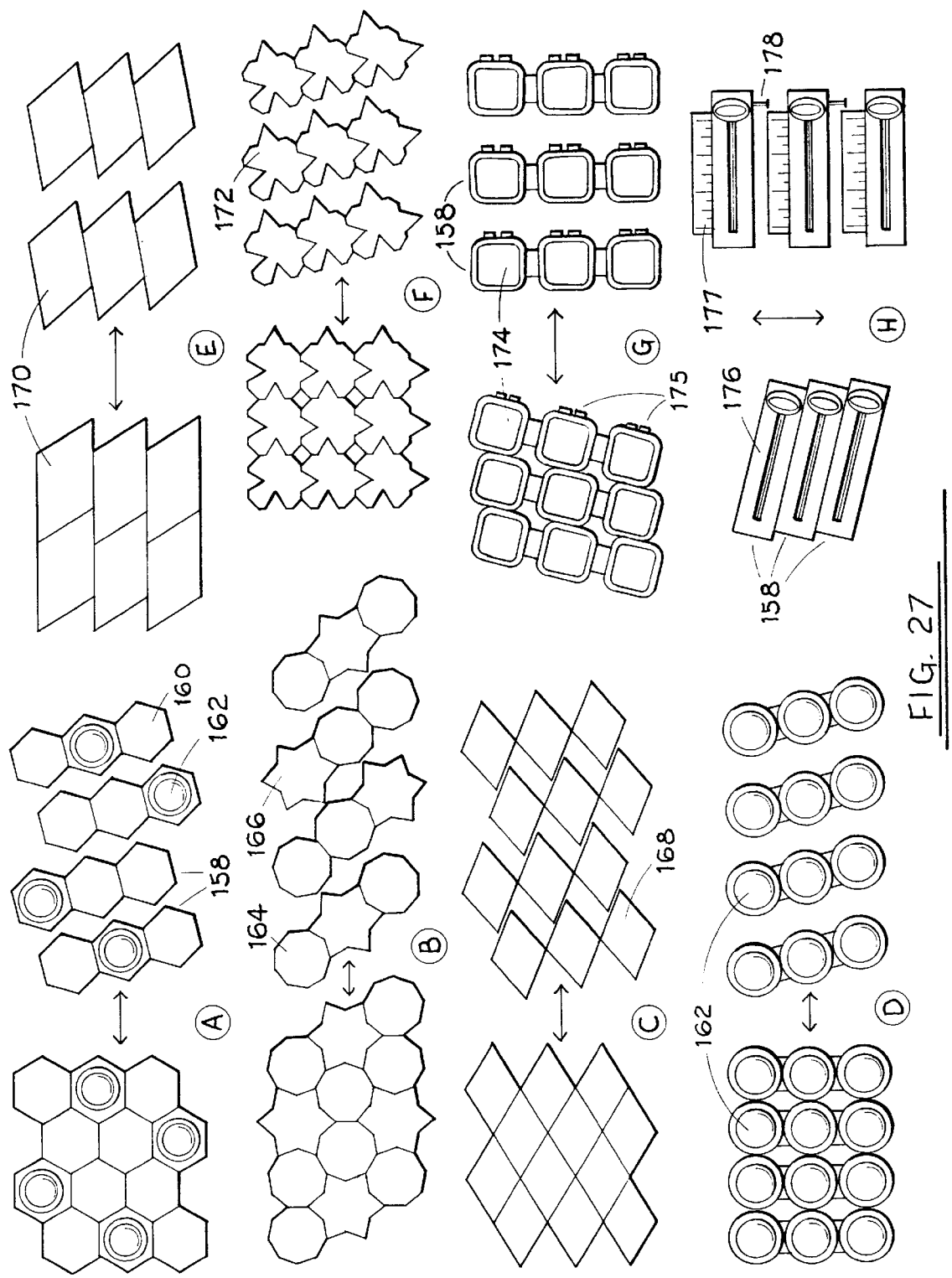

Referring to FIG. 27 of the Drawings: This includes FIGS. 27A to 27H which indicate the great variety of input/output activators that can be utilized in the Disclosed Invention. In each figure the portrayed activators are arranged in three or four columns 158 which are shown in closed and open positions.

FIG. 27A is a tiled plane of hexagonal activators 160 and indicator lights 162 (a tiled plane is a substantially planar arrangement of one or more repeated polygons of uniform size wherein the plane contains no gaps or overlaps when the activators are closed thereon).

FIG. 27B is a tiled plane of two regular polygonal activators 164 and 166.

FIG. 27C is a tiled plane of rhomboidal activators 168.

FIG. 27D is an array of indicator lights 162.

FIG. 27E is a tiled plane of parallelogramic activators 170 which could serve as LED displays.

FIG. 27F is an array of decorative polygonal activators 172.

FIG. 27G is a group of nine small television or computer monitors 174, wherein each monitor 174 has controls 175 on one side that either fit under the top of adjacent unit 174 or retract into parent unit 174 when columns 158 are closed.

FIG. 27H shows an array of three slider controls 176 wherein each slider 176 is mounted as a horizontal column 158 on a lateral assembly 10 that opens vertically, wherein each slider 176 has a spring-activated scale 177 that flips up as lateral assembly 10 is opened; then as lateral assembly 10 is closed a small plunger 178 on the underside of the control 176 immediately above pushes scale 177 back down where it is held between adjacent controls 176 when lateral assembly 10 is in closed position.

Figure 28:
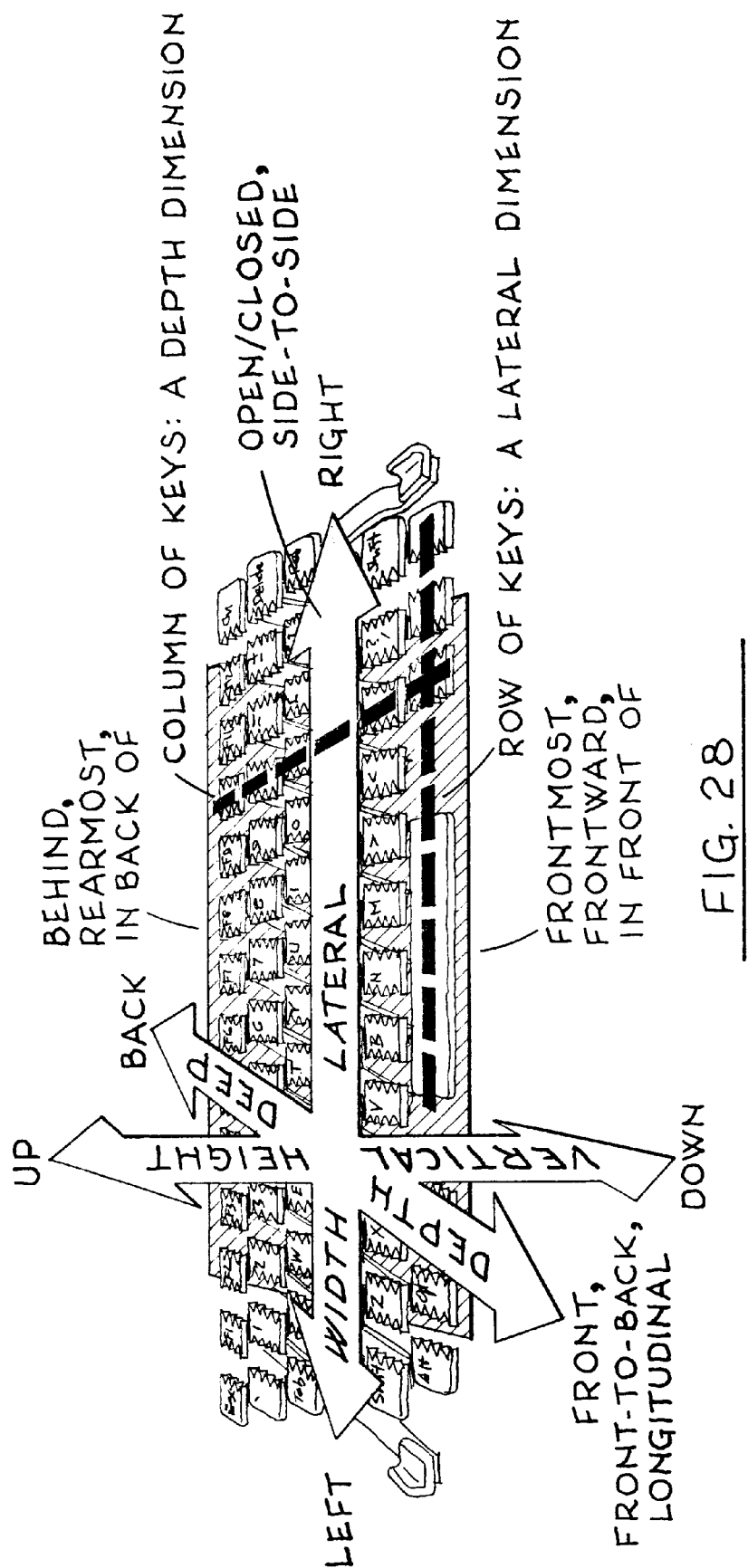

Referring to FIG. 28 of the Drawings: This view describes the orthogonal terminology that is used in this Specification and its claims in order to eliminate any confusion that may arise thereof. For example, should the keys on a basically horizontal keyboard be said to have horizontal and vertical rows? And what does wide mean? In most rectangles wide means "across narrower dimension", but when it comes to keyboards wide is often used to describe its longer lateral dimension. And how about depth: can this refer only to a vertically downward direction or also to a front-to-back direction? All such orthogonal conflicts are resolved in FIG. 28.

Although certain embodiments of the Disclosed Invention have now been described with certain a degree of particularity, each portion of its assembly and operation in whole or in part can be said to have numerous other embodiments, variations, or modifications thereof, each of which in and of itself and in any combination thereof do not depart from the scope and spirit of the Invention as disclosed herein: that what an embodiment is is not necessarily what it does.

Thus it should be understood that the foregoing description of any particular embodiments of the Disclosed Invention has been made only by way of example, and that numerous variations or modifications thereof may be resorted to without departing from the scope and spirit of the Invention as hereinafter claimed:

1. A laterally flexible input/output device by which electronic data is conducted between said device and a parent computer or other electronic system, comprising, in combination:

(a) a plurality of input/output activators arranged in a substantially planar pattern of rows aligned laterally and columns aligned generally normal to said lateral rows, wherein a substantial number of said plurality of input/output activators are aligned in a row and a column of said activators;

(b) a plurality of essentially planar and parallel upper bars that align generally with said columns of activators, a plurality of essentially planar and parallel lower bars located beneath said upper bars, and means for interconnecting said upper and lower bars to form a laterally flexible assembly which can be pulled apart to an open position and pushed together to a closed position in a direction that aligns generally with said rows of said activators;

(c) means for mounting an activator aligned in a row and a column of said activators on an upper bar of said laterally flexible assembly, wherein more than one activator mounted on said upper bar comprises a column of said activators mounted on said bar, wherein a plurality of said columns of said activators mounted on the same plurality of adjacent upper bars comprises a laterally flexible assembly of activators that can be pulled apart to an open position and pushed together to a closed position in a direction that aligns generally with said rows of said activators, wherein when said laterally flexible assembly is in open position said activators mounted thereon and said input/output device as a whole are in open position, and when said laterally flexible assembly is in closed position said activators mounted thereon and said input/output device as a whole are in closed position;

(d) means for mounting said laterally flexible assembly on an underlying base, wherein said base is selected from the group consisting of a surface of said parent computer or electronic system, a surface that is a nonintegral part of said parent system, and a surface that is not a part of said parent system; and (e) means for conducting electronic data between said activators mounted on said laterally flexible assembly and said parent system whether said activators are in open or closed position;

whereby said input/output device is used to conduct electronic data between said activators mounted thereon and said parent system whether said activators are in open or closed position;

whereby when said activators are in open position one can easily conduct electronic data between said activators and said parent system, and when said activators are in closed position one can conduct electronic data between said activators and said parent system as well as store said input/output device within a significantly shorter lateral dimension than can be done when said activators are open.

2. The input/output device according to claim 1, wherein said means for conducting electronic data between said assembly-mounted activators and said parent system comprises a network of row conductors, column conductors, and independent conductors located on said upper bars of said laterally flexible assembly, wherein (a) each row conductor connects said activators aligned in a row on said assembly; and (b) each column conductor connects said activators aligned in a column on said assembly;

whereby a plurality of said activators mounted on said upper bars of said assembly are connected to both a row conductor and a column conductor;

whereby said network of row and column conductors enables the fewest number of these conductors to serve the greatest number of activators; and (c) each independent conductor connects any activator on said assembly that operates more efficaciously if its circuitry exists apart from said network of row and column conductors on said assembly;

whereby all of said activators mounted on all of said upper bars of said assembly are connected by a network of said row conductors, column conductors, and independent conductors to said parent system.

3. The input/output device according to claim 2, wherein each row, column, and independent conductor of electronic data between said activators and said parent system comprises a microcircuit, wherein a plurality of said microcircuits arranged on a thin sheet of flexible nonconducting material comprises a microcircuitry ribbon, wherein said microcircuitry ribbons conduct electronic data between said activators and said parent system via a plurality of segments located between said activators and said parent system as follows:

(a) certain segments of said microcircuitry ribbon are located between said activators on each upper bar and a locus of electrical terminals on said bar;

(b) certain segments of said microcircuitry ribbon are located between a locus of electrical terminals on one upper bar and a locus of electrical terminals on an adjacent upper bar;

(c) certain segments of said microcircuitry ribbon are located between a locus of electrical terminals on an outer upper bar and a locus of electrical terminals on an adjacent central upper bar; and (d) a certain segment of said microcircuitry ribbon is located between a locus of electrical terminals on said central upper bar and a locus of electrical terminals in said parent system.

4. The input/output device according to claim 3, wherein said device is a keyboard for computers or other electronic systems and said activators are alphanumeric/operational keys, comprising, in combination:

(a) a top or tactile surface which one depresses slightly to activate said key;

(b) means for mounting each key on said upper bar that includes an unactivated position and an activated position, wherein said key is in unactivated position when it is not being depressed slightly and is in activated position when it is being depressed slightly;

(c) a locus of electrical contacts on said key's underportion which closes one or more microcircuits between said key and said parent system when said key is in activated position; and (d) a key-to-key spacing in each row of said keys that has the same key-to-key row spacing as the keys in a standard computer keyboard when said keys of said input/output device are in open position;

whereby each key in said keyboard has four positions: closed/unactivated, closed/activated, open/unactivated, and open/activated;

whereby when said keyboard is in open position one can type at the same speed and precision as one can on a standard-sized keyboard, and when said keyboard is in closed position one can type on it as well as store the keyboard within a significantly shorter lateral dimension than one can do when said keyboard is open.

5. The input/output device according to claim 1, wherein said plurality of said activators have interlocking sides which enable the centers of two adjacent activators to be closer together when in closed position than if said activators had straight sides;

whereby when said activators with interlocking sides are in open position they remain as easily operable as if they had normally straight sides, and when said activators are in closed position they are still operable and said input/output device can be stored in a short lateral dimension.

6. The input/output device according to claim 5, wherein said plurality of said activators rotate when said device opens and closes by opening-and-closing means that enable the two interlocking sides of any activator having two interlocking sides to be symmetrical to each other.

7. An input/output device according to claim 1, further including a pivot anchor mounted generally vertical to the underportion of said laterally flexible assembly, wherein the lower portion of said pivot anchor connects to said underlying base while the upper portion of said pivot anchor is fixed to a laterally central point on the underportion of said laterally flexible assembly, wherein as said input/output device is opened and closed all of said assembly except said fixed central point moves above said underlying base.

8. The input/output device according to claim 1, further including guide means located on the underportion of said laterally flexible assembly which articulate precise settings for said open or closed positions for said assembly, said activators mounted thereon, and said input/output device as a whole.

9. The input/output device according to claim 1, further including a plurality of hooks that extend from the adjacent sides of adjacent lower bars of said laterally flexible assembly in the plane of said lower bars, thus providing said adjacent sides of said adjacent lower bars with hooks that face each other, whereas when said assembly is in open position said hooks interlock to maintain the prescribed open spacing between said lower bars and said activators mounted thereabove.

10. The input/output device according to claim 1, further including a plurality of sliding slotted stops slidably connected to the undersides of said lower bars of said laterally flexible assembly, whereas when said assembly is in open position said sliding slotted stops maintain the prescribed open spacing between said lower bars and said activators mounted thereabove.

11. The input/output device according to claim 1, wherein said upper or lower bars of said laterally flexible assembly are wider than the narrowest width of said activators mounted thereabove, wherein when said assembly is in closed position said wider bars maintain a small space between adjacent activators mounted thereabove;

whereby said space keeps one activator from accidentally activating an adjacent activator when it is activated.

12. The input/output device according to claim 1, wherein said upper bars have sloping top surfaces to urge the shedding of dust and other microdebris from the vicinities of said sloping top surfaces of said upper bars.

13. The input/output device according to claim 1, further including a plurality of legs mounted under the outer portions of said laterally flexible assembly, wherein as said assembly is opened said legs move outward with said assembly to support said outer portions of said assembly when in open position, wherein the undersides of said legs lie generally in the same plane on which the underside of said input/output device rests when in open position.

14. The input/output device according to claim 1, further including a plurality of outriggers mounted beneath the outer portions of said laterally flexible assembly, wherein as said assembly is opened said outriggers extend outward with said assembly to support said outer portions of said assembly when in open position, wherein the undersides of said outriggers lie above the plane on which the underside of said input/output device rests when in open position;

whereby said outriggers enable said input/output device to rest on any nonplanar surface when said assembly is in open position.

15. The input/output device according to claim 1, further including handles on the sides of said laterally flexible assembly to facilitate the opening and closing of said assembly.

16. The input/output device according to claim 1, further including means for mounting said device remotely from said parent system, wherein said remote mounting includes conductance of electronic data from said device to said parent system by means selected from the group consisting of wireless/infrared portals and flexible extension conductors;

whereby said remote mounting enables said device and said parent system to be more mobile as well as enables said device to connect to a plurality of parent systems.

17. The input/output device according to claim 1, further including means for mounting said device on a mobile base that can be moved into and out of said parent system, wherein said mobile base includes conductance of electronic data from said device to said parent system by means selected from the group consisting of wireless/infrared conductance and flexible electric extension cords;

whereby said mobile base enables said device to be stored inside said parent system when closed and enables said device to be used when open or closed.

18. The input/output device according to claim 3, wherein each segment of microcircuitry ribbon that is located between said activators on each upper bar and a locus of electrical terminals on said bar has a locus of electrical contacts in the vicinity of each activator from which said ribbon conducts electronic data.

19. The input/output device according to claim 3, wherein each segment of microcircuitry ribbon that is located between said activators on each upper bar and a locus of electrical terminals on said bar is secured to said upper bar by a plurality of projections and slots along said upper bar.

20. The input/output device according to claim 3, wherein each segment of microcircuitry ribbon that is located between said activators on each upper bar and a locus of electrical terminals on said bar is secured to said upper bar by adhesive means between said ribbon and said upper bar.

21. The input/output device according to claim 3, wherein each segment of microcircuitry ribbon that is located between a locus of electrical terminals on one upper bar and a locus of electrical terminals on an adjacent upper bar or adjacent central upper bar comprises a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from the property of flexibility inherent in the materials of which said ribbon is made.

22. The input/output device according to claim 3, wherein each segment of microcircuitry ribbon that is located between a locus of electrical terminals on one upper bar and a locus of electrical terminals on an adjacent upper bar or adjacent central upper bar comprises a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from one or more folding means in said ribbon.

23. The input/output device according to claim 3, wherein each segment of microcircuitry ribbon that is located between a locus of electrical terminals on said central upper bar and a locus of electrical terminals in said parent system comprises a flexible microcircuitry ribbon, wherein as the distance between said terminals on said central upper bar and said parent system varies as said lateral assembly is open and closed said flexible ribbon conducts electronic data continuously between said central upper bar and said parent system, wherein said flexibility of said ribbon is derived at least in part from the property of flexibility inherent in the materials of which said ribbon is made.

24. The input/output device according to claim 3, wherein each segment of microcircuitry ribbon that is located between a locus of electrical terminals on said central upper bar and a locus of electrical terminals in said parent system comprises a flexible microcircuitry ribbon, wherein as the distance between said terminals on said central upper bar and said parent system varies as said lateral assembly is open and closed said flexible ribbon conducts electronic data continuously between said central upper bar and said parent system, wherein said flexibility of said ribbon is derived at least in part from one or more folding means in said ribbon.

25. The input/output device according to claim 2, further including means for conducting electronic data between a locus of electrical terminals on one upper bar and a locus of electrical terminals on an adjacent upper bar or central upper bar via wireless/infrared means, wherein as the distance between said terminals on said adjacent bars varies as said bars are open and closed said wireless/infrared means conducts electronic data continuously between said upper bars.

26. The input/output device according to claim 2, further including means for conducting electronic data between a locus of electrical terminals on said central upper bar and a locus of electrical terminals in said parent system via wireless/infrared means, wherein as the distance between said terminals on said central bar and said parent system varies as said laterally flexible assembly is open and closed said wireless/infrared means conducts electronic data continuously between said central bar and said parent system.

27. The input/output device according to claim 1, wherein certain activators of said input/output device are located next to the front or back edges of said laterally flexible assembly instead of on said assembly, wherein said activators may include (a) elongate activators whose length exceeds the lateral distance between two adjacent upper bars of said assembly;

(b) activators whose depth is greater than can be practically contained within the depth of said laterally flexible assembly;

(c) general system controls and indicators whose activatability is little affected by different open or closed positions; and (c) activators located adjacently to those sides of said laterally flexible assembly that do not move substantially out or in as said assembly is opened or closed; whereby such non-assembly-mounted but integrally functional activators are easily located along the top and bottom edges of said assembly, where they can be adjacent to said assembly-mounted activators without being mounted on said assembly or obstructing the opening and closing of said assembly.

28. The input/output device according to claim 4, wherein said means for mounting each key on said upper bar includes the confinement of one or more surfaces under said key's top by correspondingly confining surfaces in said upper bar to assure the accurate guidance of said key as it moves between unactivated and activated positions.

29. The input/output device according to claim 4, wherein said means for mounting each key on said upper bar includes a retaining means between said key's top and said upper bar to keep said key from detaching from said bar when said key is in unactivated position.

30. The input/output device according to claim 4, wherein said means for mounting each key on a said upper bar includes an elastic means between said key and said upper bar which returns said key to said unactivated position after said key has been activated.

31. The input/output device according to claim 4, wherein said means for mounting each of said columns of said keys on said upper bar includes mounting one or more of said keys in said column slightly out of columnar alignment with one or more of the other keys in said column of keys on said bar;

whereby said out-of-columnar alignment duplicates the nonalignment of similar columns of keys on standard keyboards.

32. The input/output device according to claim 4, wherein said locus of electrical contacts on said key's underportion which closes one or more microcircuits between said key and said parent system when said key is activated is situated beneath said key's top or tactile surface.

33. The input/output device according to claim 4, wherein said locus of electrical contacts on said key's underportion which closes one or more microcircuits between said key and said parent system when said key is activated is situated on a projection descending from key's top or tactile surface.

34. The input/output device according to claim 4, wherein each upper bar includes one or more cavities that urge the shedding of dust from the vicinity of said cavity and related componentry without appreciably reducing the strength of said bar.

35. The input/output device according to claim 4, wherein each upper bar includes one or more cavities that facilitate the manufacture of said upper bar and related componentry without appreciably reducing the strength of said bar.

36. The input/output device according to claim 4, wherein each upper bar includes one or more cavities that reduce the amount of mass in said upper bar while not appreciably reducing the strength of said bar.

37. The input/output device according to claim 4, wherein a rear row of keys of said keyboard is not located on said laterally flexible assembly but in a stationary position behind said assembly, wherein each stationary key in said stationary row behind said assembly conducts electronic data between itself and said parent system when said assembly is in open or closed position.

38. The input/output device according to claim 4, wherein a front row of keys of said keyboard is not located on said laterally flexible assembly but in a stationary position in front of said assembly, wherein each stationary key in said stationary row in front of said assembly conducts electronic data between itself and said parent system when said laterally flexible assembly is in open or closed position.

39. The input/output device according to claim 4, wherein the elongate spacebar of said keyboard is not mounted on said laterally flexible assembly but in a stationary position in front of said assembly, wherein said stationary spacebar conducts electronic data between itself and said parent system when said laterally flexible assembly is in open or closed position.

40. The input/output device according to claim 37, further including a handle mechanism topically contiguous to said spacebar of said keyboard, wherein said handle mechanism urges said spacebar up to facilitate the opening and closing of said keyboard and/or urges said spacebar down in its unactivated position when said keyboard is in open or closed position.

41. The input/output device according to claim 37, further including a spring/catch mechanism under said spacebar of said keyboard, wherein said spring of said mechanism urges said spacebar up to facilitate the opening and closing of said keyboard while said catch of said mechanism holds said spacebar down in its unactivated position when said keyboard is in open or closed position.

42. A method for conducting electronic data between a laterally flexible input/output device and a parent computer or other electronic system, comprising, in combination:
- (a) arranging a plurality of input/output activators in a substantially planar pattern of rows aligned generally laterally and columns aligned generally normal to said rows, wherein a substantial number of said plurality of said input/output activators are aligned in a row and a column of said activators;
- (b) arranging a plurality of essentially planar and parallel upper bars that align generally with said columns of activators directly above a plurality of essentially planar and parallel lower bars, then interconnecting said upper and lower bars to form a laterally flexible assembly which can be pulled apart to an open position and pushed together to a closed position in a direction that aligns generally with said rows of said activators;
- (c) mounting an activator aligned in a row and a column of said activators on an upper bar of said laterally flexible assembly, wherein more than one activator mounted on said upper bar comprises a column of said activators mounted on said bar, wherein a plurality of said columns of said activators mounted on the same plurality of adjacent upper bars comprises a laterally flexible assembly of activators that can be pulled apart to an open position and pushed together to a closed position in a direction that aligns generally with said rows of said activators, wherein when said laterally flexible assembly is in open position said activators mounted thereon and said input/output device as a whole are in open position, and when said assembly is in closed position said activators mounted thereon and said input/output device as a whole are in closed position;
- (d) mounting said laterally flexible assembly on an underlying base, wherein said base is selected from the group consisting of a surface of said parent computer or electronic system, a surface that is not an integral part of said parent system, and a surface that is not any part of said parent system; and
- (e) conducting electronic data between said activators and said parent system whether said activators are in open or closed position;
  whereby said input/output device is used to conduct electronic data between said activators mounted thereon and said parent system whether said activators are in open or closed position;
  whereby when said activators are in open position one can easily conduct electronic data between said activators and said parent system, and when said activators are in closed position one can conduct electronic data between said activators and said parent system as well as store said input/output device within a significantly shorter lateral dimension than can be done when said activators are open.

43. A method according to claim 42 further including the steps of providing a network of conductors on said upper bars of said laterally flexible assembly for purposes of conducting electronic data between said assembly-mounted activators and said parent system, comprising:
- (a) connecting a plurality of said activators aligned in each row of activators on said assembly with a row conductor; and
- (b) connecting a plurality of said activators aligned in a column of activators on said assembly with a column conductor;
  whereby a plurality of said activators on said upper bars of said assembly are connected to both a row conductor and a column conductor;
  whereby said network of row and column conductors enables the fewest number of such conductors to serve the greatest number of activators; and
- (c) connecting any activator that operates more efficaciously if its circuitry is apart from said row and column conductors with an independent conductor;
  whereby all of said activators on all of said upper bars of said assembly are connected by a network of said row conductors, column conductors, and independent conductors to said parent system.

44. A method according to claim 43 further including the steps of wiring each row, column, and independent conductor of electronic data between said activators and said parent system as a microcircuit of said input/output device, then arranging a plurality of said microcircuits on a thin sheet of flexible nonconducting material, thus forming a microcircuitry ribbon, then locating a plurality of said microcircuitry ribbons in certain segments between said activators and said parent system as follows:
- (a) locating certain segments of said microcircuitry ribbon between said activators on each upper bar and a locus of electrical terminals on said upper bar;
- (b) locating certain segments of said microcircuitry ribbon between a locus of electrical terminals on one upper bar and a locus of electrical terminals on an adjacent upper bar;
- (c) locating certain segments of said microcircuitry ribbon between a locus of electrical terminals on an outer upper bar and a locus of electrical terminals on an adjacent central upper bar; and
- (d) locating a certain segment of said microcircuitry ribbon between a locus of electrical terminals on said central upper bar and a locus of electrical terminals in said parent system.

45. A method according to claim 44 further including the steps of utilizing said input/output device as a keyboard for computers or other electronic systems wherein said activators are alphanumeric/operational keys, comprising:
- (a) forming a top or tactile surface for each key which one depresses slightly to activate said key;
- (b) providing each key on said upper bar with an unactivated position and an activated position, wherein said key is in unactivated position when it is not being depressed slightly and is in activated position when it is being depressed slightly;
- (c) providing a locus of electrical contacts on said key's underportion which closes one or more microcircuits between said key and said parent system when said key is activated; and
- (d) providing a key-to-key spacing in each row of said keys that has the same key-to-key spacing as the keys in a standard computer keyboard when said keys of said input/output device are in open position;
  whereby each key in said keyboard has four positions: closed/unactivated, closed/activated, open/unactivated, and open/activated;

whereby when said keyboard is in open position one can type at the same speed and precision as one can on a standard-sized keyboard, and when said keyboard is in closed position one can type on it and the keyboard can be stored within a significantly shorter lateral dimension than when it is open.

46. A method according to claim 42 further including the steps of providing a plurality of said activators with interlocking sides which enable the centers of two adjacent activators to be closer together when in closed position than if said activators had straight sides;

whereby when said activators with interlocking sides are in open position they remain as easily operable as if they had normally straight sides, and when said activators are in closed position they are still operable and said input/output device can be stored in a short lateral dimension.

47. A method according to claim 46 further including the steps of rotating a plurality of said activators when said input/output device opens and closes wherein said rotating of activators enables the two interlocking sides of any activator having two interlocking sides to be symmetrical to each other.

48. A method according to claim 42 further including the step of mounting a pivot anchor generally vertical to the underportion of said laterally flexible assembly by connecting the lower portion of said pivot anchor to said underlying base and fixing the upper portion of said pivot anchor to a laterally central point on said underportion of said assembly, wherein as said input/output device is opened and closed all of said laterally flexible assembly except said fixed central point moves above said underlying base.

49. A method according to claim 42 further including the step of locating guides on the underportion of said laterally flexible assembly which articulate precise settings for said open or closed positions simultaneously for said assembly, said activators mounted thereon, and said input/output device as a whole.

50. A method according to claim 42 further including the step of extending a plurality of hooks from the adjacent sides of adjacent lower bars of said laterally flexible assembly in the plane of said lower bars, thus providing said adjacent sides of said adjacent lower bars with hooks that face each other, wherein when said assembly is in open position said hooks interlock to assure the prescribed open spacing between said lower bars and said activators mounted thereabove.

51. A method according to claim 42 further including the step of slidably connecting a plurality of sliding slotted stops to the undersides of said laterally flexible assembly, wherein when said assembly is in open position said sliding slotted stops assure the prescribed open spacing between said lower bars and said activators mounted thereabove.

52. A method according to claim 42 further including the step of making said upper or lower bars of said laterally flexible assembly wider than the narrowest width of said activators mounted thereabove, thus enabling said wider bars to maintain a small space between adjacent activators mounted thereabove when said wider bars are in closed position;

whereby said space keeps one activator from accidentally activating an adjacent activator when it is activated.

53. A method according to claim 42 further including the step of sloping the top surfaces of said upper bars to urge the shedding of dust and other microdebris from the vicinities of said sloping top surfaces of said upper bars.

54. A method according to claim 42 further including the step of mounting a plurality of legs under the outer portions of said laterally flexible assembly to support said outer portions of said assembly when in open position, wherein as said assembly is opened said legs move outward with said assembly to support said outer portions of assembly when in said open position, wherein the bottom surfaces of said legs lie generally in the same plane on which the underside of said input/output device rests when in open position.

55. A method according to claim 42 further including the step of mounting a plurality of outriggers beneath the outer portions of said laterally flexible assembly to support said outer portions of said assembly when in open position, wherein as said assembly is opened said outriggers extend outward under said assembly to support said outer portions of said assembly when in open position, wherein the bottom surfaces of said outriggers lie above the plane on which the underside of said input/output device rests;

whereby said outriggers enable said input/output device to rest on any nonplanar surface when said assembly is in open position.

56. A method according to claim 42 further including the step of mounting handles on the sides of said laterally flexible assembly to facilitate the opening and closing of said assembly.

57. A method according to claim 42 further including the step of mounting said device remotely from said parent system, wherein said remote mounting includes conductance of electronic data from said device to said parent system by methods selected from the group consisting of wireless/infrared portals and flexible extension conductors;

whereby said remote mounting enables said device and said parent system to be more mobile and enables said device to connect to a plurality of parent systems.

58. A method according to claim 42 further including the step of or mounting said device on a mobile base that can be moved into and out of said parent system, wherein said mobile base includes conductance of electronic data from said device to said parent system by methods selected from the group consisting of wireless/infrared portals and flexible electric extension cords;

whereby said mobile base enables said device to be stored inside said parent system when closed and enables said device to be used when open or closed.

59. A method according to claim 44 further including the step of providing each segment of said microcircuitry ribbon located between said activators on each upper bar and a locus of electrical terminals on said upper bar with a locus of electrical contacts in the vicinity of each activator on said bar, wherein said electrical contacts conduct electronic data between said activator and said parent system when said assembly is in open or closed position.

60. A method according to claim 44 further including the step of securing in place each segment of microcircuitry ribbon located between said activators on each upper bar and said locus of electrical terminals on said upper bar, wherein said method for securing in place includes mounting a plurality of projections and slots along said upper bar.

61. A method according to claim 44 further including the step of securing in place each segment of microcircuitry ribbon located between said activators on each upper bar and said locus of electrical terminals on said upper bar, wherein said method for securing in place includes applying adhesive between said ribbon and said upper bar.

62. A method according to claim 44 further including the step of providing a certain segment of microcircuitry ribbon located between a locus of electrical terminals on one upper bar and a locus of electrical terminals on an adjacent upper bar or adjacent central upper bar with a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from the property of flexibility inherent in the materials of which said flexible ribbon is made.

63. A method according to claim 44 further including the step of providing a certain segment of microcircuitry ribbon located between a locus of electrical terminals on one upper bar and a locus of electrical terminals on an adjacent upper bar or adjacent central upper bar with a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from one or more folds in said flexible ribbon.

64. A method according to claim 44 further including the step of providing a certain segment of microcircuitry ribbon located between a locus of electrical terminals on said central upper bar and a locus of electrical terminals in said parent system with a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from the property of flexibility inherent in the materials of which said flexible ribbon is made.

65. A method according to claim 44 further including the step of providing a certain segment of microcircuitry ribbon located between a locus of electrical terminals on said central upper bar and a locus of electrical terminals in said parent system with a flexible microcircuitry ribbon, wherein as the distance between said terminals on said adjacent bars varies as said bars are open and closed said flexible ribbon conducts electronic data continuously between said bars, wherein said flexibility of said ribbon is derived at least in part from one or more folds in said flexible ribbon.

66. A method according to claim 44 further including the step of conducting electronic data between a locus of electrical terminals on one upper bar and a locus of electrical terminals on an adjacent upper bar or central upper bar via wireless/infrared means, wherein as the distance between said terminals on said adjacent bars varies as said bars are open and closed said wireless/infrared means conducts electronic data continuously between said upper bars.

67. A method according to claim 44 further including the step of conducting electronic data between a locus of electrical terminals on said central upper bar and a locus of electrical terminals in said parent system via wireless/infrared means, wherein as the distance between said terminals on said central bar and said parent system varies as said laterally flexible assembly is open and closed said wireless/infrared means conducts electronic data continuously between said central bar and said parent system.

68. A method according to claim 42 further including the step of locating certain activators of said input/output device adjacent to the front or back edges of said laterally flexible assembly instead of on said assembly, wherein said activators may include:

(a) elongate activators whose length exceeds the lateral distance between two adjacent upper bars of said assembly;

(b) activators whose depth is greater than can be practically contained within the depth of said laterally flexible assembly;

(c) general system controls and indicators whose activatability is little affected by different open or closed positions; and (c) activators located adjacent to those sides of said laterally flexible assembly that do not move substantially out or in as said assembly is opened or closed;

whereby such non-assembly-mounted but integrally functional activators are easily located along the top and bottom edges of said assembly where they can be adjacent to said assembly-mounted activators without being mounted on said assembly or obstructing the opening and closing of said assembly.

69. A method according to claim 45 further including the step of assuring the accurate guidance of said key as it moves between said unactivated and activated positions by snugly confining one or more surfaces under said key's top with one or more snugly confining surfaces in said upper bar.

70. A method according to claim 45 further including the step of retaining said key in said upper bar when said key is in unactivated position by aligning a projection on said key with a projection in said upper bar so that said projections overlap to keep said key in said bar.

71. A method according to claim 45 further including the step of returning said key to said unactivated position after said key has been activated by situating an extensive elastic member between said key and the portion of said upper bar in which said key is mounted.

72. A method according to claim 45 further including the step of mounting one or more keys in each column of keys on said upper bar slightly out of columnar alignment with one or more of the other keys in said column of keys on said bar;

whereby said out-of-columnar alignment duplicates the nonalignment of similar columns of keys on standard keyboards.

73. A method according to claim 45 further including the step of situating beneath said key's topmost portion a locus of electrical contacts which closes one or more microcircuits between said key and said parent system when said key is activated.

74. A method according to claim 45 further including the step of situating beneath said key's topmost portion a projection with a locus of electrical contacts which closes one or more of said microcircuits between said key and said parent system when said key is activated.

75. A method according to claim 45 further including the step of locating one or more cavities in said bar wherein said cavities urge the shedding of dust and other microdebris settling in the vicinity of said cavity without appreciably reducing the strength of said bar.

76. A method according to claim 45 further including the step of locating one or more cavities in said bar wherein said cavities facilitate the manufacture of said upper bar and proximate componentry without appreciably reducing the strength of said bar.

77. A method according to claim 45 further including the step of locating one or more cavities in said bar wherein said cavities reduce the amount of mass in said upper bar without appreciably reducing the strength of said bar.

78. A method according to claim 45 further including the step of locating a row of keys of said keyboard in a stationary position adjacent to the rear edge of said laterally flexible assembly, wherein each stationary key in said stationary back row conducts electronic data between itself and said parent system whether said laterally flexible assembly is open or closed.

79. A method according to claim 45 further including the step of locating a front row of keys of said keyboard in a stationary position adjacent to the front edge of said laterally flexible assembly, wherein each stationary key in said stationary front row conducts electronic data between itself and said parent system whether said laterally flexible assembly is open or closed.

80. A method according to claim 45 further including the step of mounting an elongate spacebar of said keyboard in a stationary position adjacent to the front edge of said laterally flexible assembly, wherein said stationary spacebar conducts electronic data between itself and said parent system whether said laterally flexible assembly is open or closed.

81. A method according to claim 80 further including the step of providing a handle mechanism topically contiguous to said spacebar of said keyboard, wherein said handle mechanism urges said spacebar up to facilitate the opening and closing of said keyboard and/or urges said spacebar down to its normal unactivated position when said keyboard is in open or closed position.

82. A method according to claim 80 further including the step of providing a spring/catch mechanism beneath said spacebar of said keyboard, wherein said spring of said mechanism urges said spacebar up to facilitate the opening and closing of said keyboard while said catch of said mechanism holds said spacebar down in its normal unactivated position when said keyboard is in open or closed position.

* * * * *